(12) United States Patent
Ratz

(10) Patent No.: US 6,310,940 B1
(45) Date of Patent: Oct. 30, 2001

(54) PERSONAL COMPUTER INTERACTIVE PHONE SYSTEM

(75) Inventor: Roger W. Ratz, Naperville, IL (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/298,409

(22) Filed: Apr. 23, 1999

Related U.S. Application Data

(63) Continuation-in-part of application No. 08/972,351, filed on Nov. 17, 1997, which is a continuation of application No. 08/766,122, filed on Dec. 16, 1966.

(51) Int. Cl.$^7$ .................................................... H04M 1/64
(52) U.S. Cl. ..................................... 379/88.01; 379/88.03; 379/160
(58) Field of Search ..................................... 379/198, 165, 379/166, 167, 93.01, 93.05, 93.14, 93.15, 159, 160, 91.01, 110.01, 88.23, 88.26, 88.01, 88.02, 88.03; 370/419, 524, 260, 263, 264, 384

(56) References Cited

U.S. PATENT DOCUMENTS

| | | | |
|---|---|---|---|
| 2,810,782 | 10/1957 | Hester | 178/5.6 |
| 4,459,434 | 7/1984 | Benning et al. | 179/81 B |
| 4,578,540 | 3/1986 | Borg et al. | 179/2 A |
| 4,701,945 | 10/1987 | Pedigo | 379/66 |
| 4,731,821 | 3/1988 | Jackson, III | 379/172 |
| 4,734,932 | 3/1988 | Lott | 379/160 |
| 4,757,496 | 7/1988 | Barthdlet et al. | 370/85 |
| 4,757,525 | 7/1988 | Matthews et al. | 379/89 |
| 4,821,319 | 4/1989 | Middleton et al. | 379/167 |
| 4,837,808 | 6/1989 | Immendorfere et al. | 379/96 |
| 4,903,291 | * 2/1990 | Tsurufuji et al. | 379/88.01 |
| 4,942,598 | 7/1990 | Davis | 379/57 |
| 4,996,709 | 2/1991 | Heep et al. | 379/160 |
| 5,027,384 | 6/1991 | Morganstein | 379/67 |

(List continued on next page.)

OTHER PUBLICATIONS

Newton's Telecom Directory, 8$^{th}$ Edition (2 Pages) US Statutory Invention Registration No. H 1646 Issued on May 6, 1997 Inventor: Kato et al.

Primary Examiner—Ahmad Matar
Assistant Examiner—Benny Q. Tieu
(74) Attorney, Agent, or Firm—Maginot, Addison & Moore

(57) ABSTRACT

A telephone system for providing advanced telephony includes a first phone system adapter and a phone system controller. The first phone system adapter is coupled between a first telephone handset and a telephone line. Furthermore, the first phone system adapter is operable to (i) selectively couple the first telephone handset to the telephone line, (ii) receive an oral command from the first telephone handset when the first telephone handset is decoupled from the telephone line, and (iii) transmit the oral command to the phone system controller via the telephone line while the first telephone handset is decoupled from the telephone line. The phone system controller is coupled to the telephone line. Moreover, the phone system controller includes a personal computer system having an interactive phone system board and a computer readable medium. The computer readable medium includes programs that configure the personal computer system and the interactive phone system board to (i) receive the oral commands via the telephone line, and (ii) execute the oral command.

20 Claims, 18 Drawing Sheets

U.S. PATENT DOCUMENTS

| | | | |
|---|---|---|---|
| 5,066,939 | 11/1991 | Mansfield, Jr. | 340/310 R |
| 5,125,026 | 6/1992 | Holcombe | 379/167 |
| 5,127,045 | 6/1992 | Cragun et al. | 379/88 |
| 5,165,095 | 11/1992 | Borcherding | 379/88 |
| 5,222,125 | 6/1993 | Creswell et al. | 379/67 |
| 5,268,666 | 12/1993 | Michel et al. | 340/310 R |
| 5,274,693 * | 12/1993 | Waldman | 379/354 |
| 5,278,899 | 1/1994 | Levitan | 379/399 |
| 5,283,825 | 2/1994 | Druckman et al. | 379/167 |
| 5,325,421 | 6/1994 | Hou et al. | 379/67 |
| 5,327,486 | 7/1994 | Wolff et al. | 379/96 |
| 5,329,578 | 7/1994 | Brennan et al. | 379/67 |
| 5,341,415 * | 8/1994 | Baran | 379/201 |
| 5,353,331 | 10/1994 | Emery et al. | 379/58 |
| 5,359,598 | 10/1994 | Steagau et al. | 370/58.1 |
| 5,381,459 | 1/1995 | Lappington | 379/56 |
| 5,394,445 | 2/1995 | Ball et al. | 379/67 |
| 5,396,542 | 3/1995 | Alger et al. | 379/67 |
| 5,400,327 | 3/1995 | Dezonno | 370/62 |
| 5,420,912 | 5/1995 | Kopp et al. | 379/63 |
| 5,422,949 * | 6/1995 | Tsukagoshi | 379/399 |
| 5,440,627 | 8/1995 | Puri | 379/355 |
| 5,446,785 | 8/1995 | Hirai | 379/142 |
| 5,448,635 * | 9/1995 | Biehl et al. | 379/399 |
| 5,450,412 | 9/1995 | Takebayashi et al. | 370/95.1 |
| 5,479,489 | 12/1995 | O'Brien | 379/67 |
| 5,481,594 | 1/1996 | Shen et al. | 379/67 |
| 5,490,145 | 2/1996 | Tanabe et al. | 370/85.4 |
| 5,550,900 | 8/1996 | Ensor et al. | 379/67 |
| 5,561,788 | 10/1996 | Letwin | 395/500 |
| 5,563,939 | 10/1996 | La Porta et al. | 379/220 |
| 5,566,160 | 10/1996 | Lo | 370/13.1 |
| 5,579,379 | 11/1996 | D'Amico et al. | 379/112 |
| 5,581,604 | 12/1996 | Robinson et al. | 379/67 |
| 5,598,412 | 1/1997 | Griffith et al. | 370/352 |
| 5,598,456 | 1/1997 | Feinberg | 379/42 |
| 5,604,790 | 2/1997 | Grimes | 379/67 |
| 5,608,780 | 3/1997 | Gerszberg et al. | 379/58 |
| 5,610,922 | 3/1997 | Balatoni | 370/468 |
| 5,610,972 | 3/1997 | Emery et al. | 379/58 |
| 5,619,553 | 4/1997 | Young et al. | 379/61 |
| 5,621,731 | 4/1997 | Dale et al. | 370/79 |
| 5,623,537 | 4/1997 | Ensor et al. | 379/67 |
| 5,638,373 | 6/1997 | Takebayashi et al. | 370/467 |
| 5,651,053 | 7/1997 | Mitchell | 379/67 |
| 5,657,380 | 8/1997 | Mozer | 379/88 |
| 5,734,699 | 3/1998 | Lu et al. | 379/58 |
| 5,754,637 | 5/1998 | Choi | 379/167 |
| 5,761,292 | 6/1998 | Wagner et al. | 379/229 |
| 5,796,806 | 8/1998 | Birckbichler | 379/67 |
| 5,802,467 | 9/1998 | Salazar et al. | 455/420 |
| 5,933,775 * | 8/1999 | Peters | 455/420 |
| 6,081,782 * | 6/2000 | Rabin | 704/275 |

\* cited by examiner

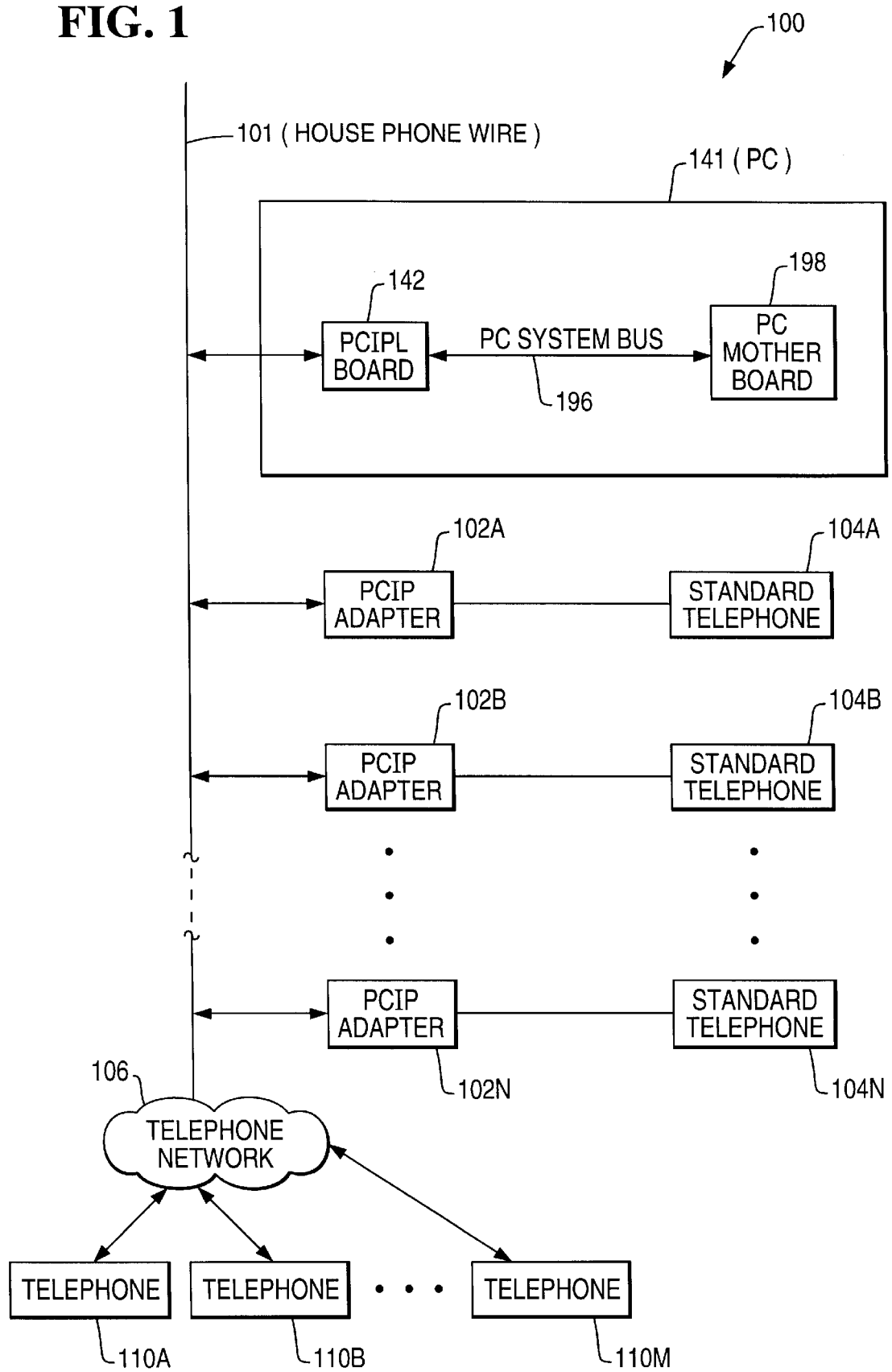

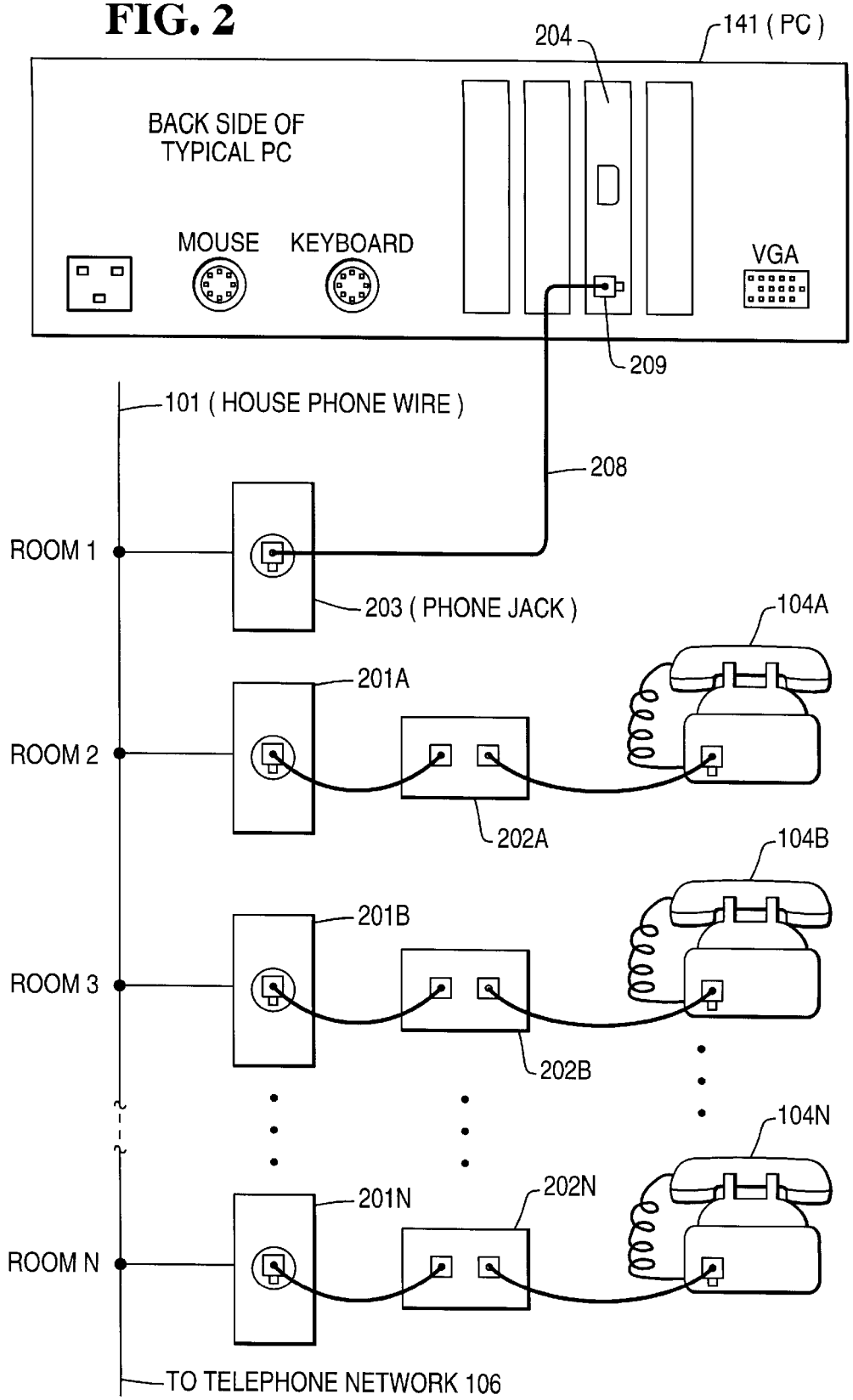

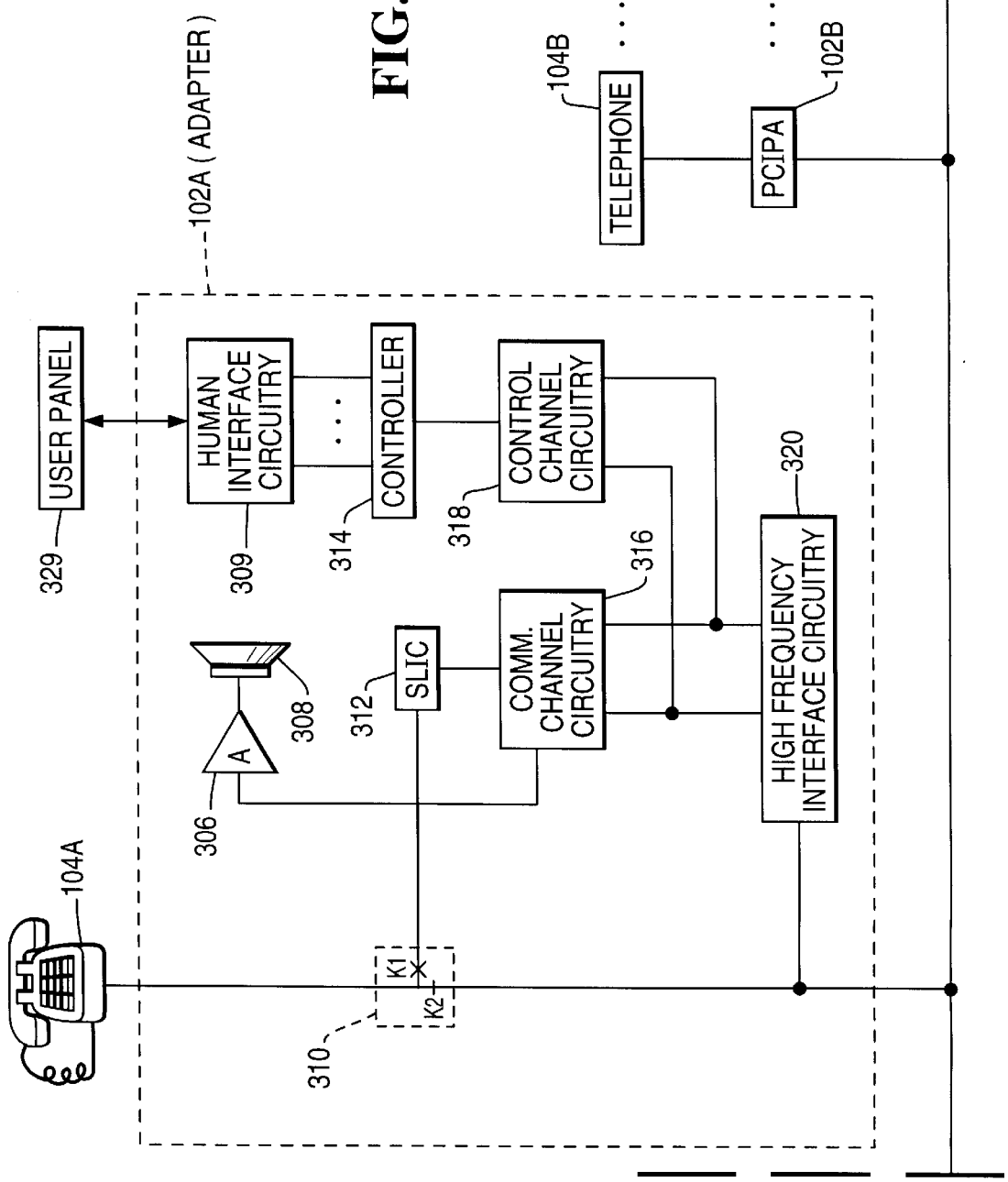

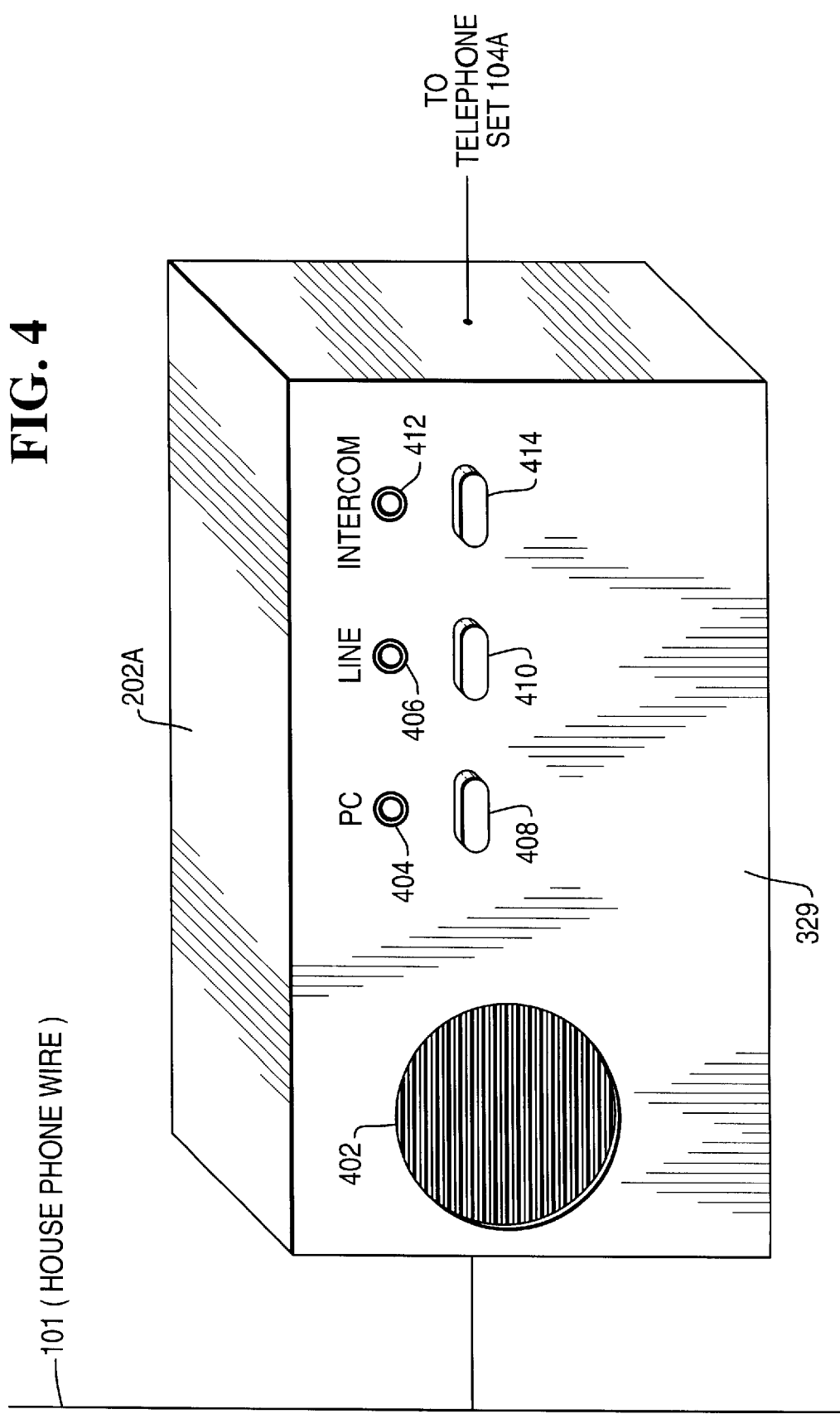

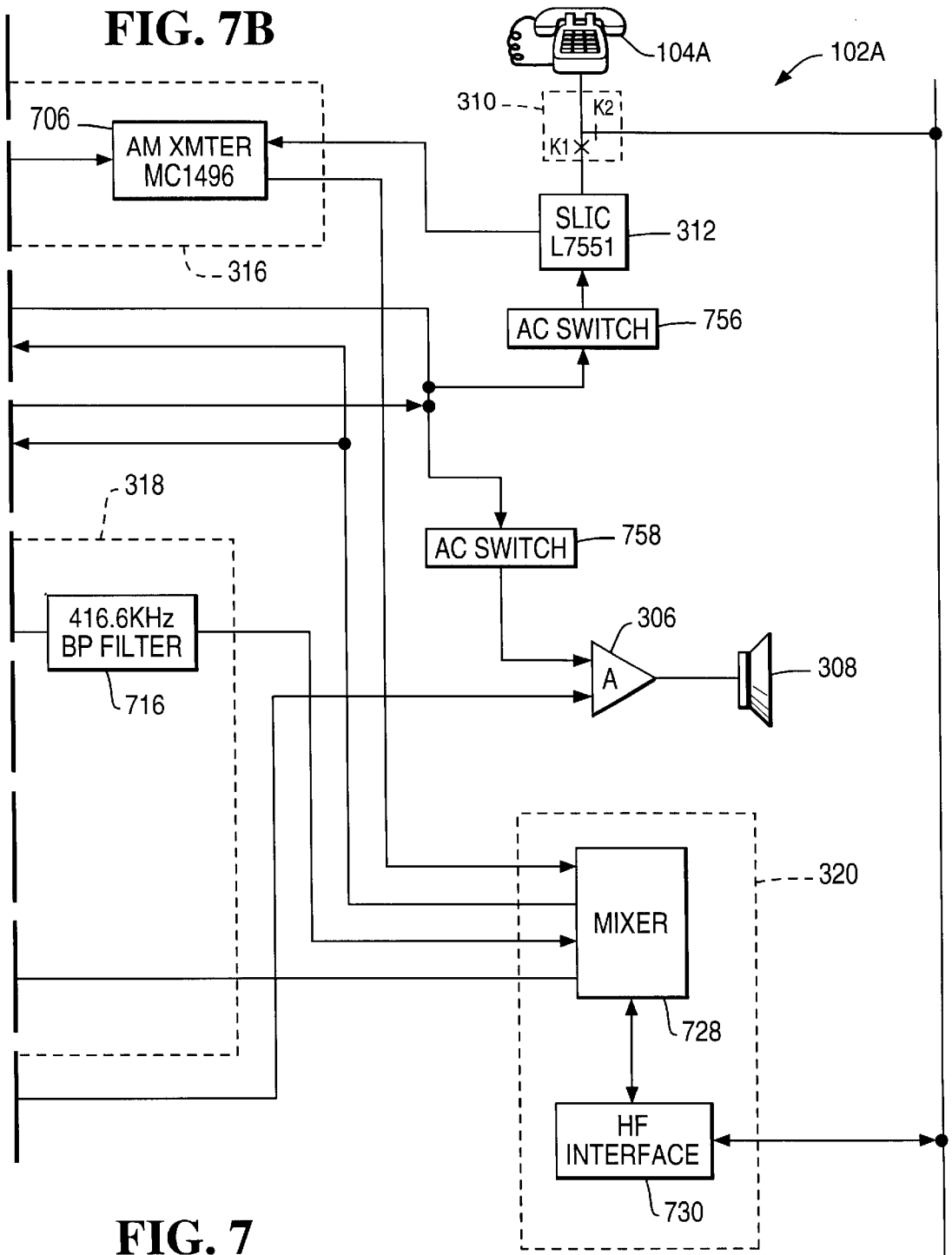
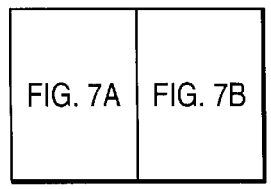
FIG. 7

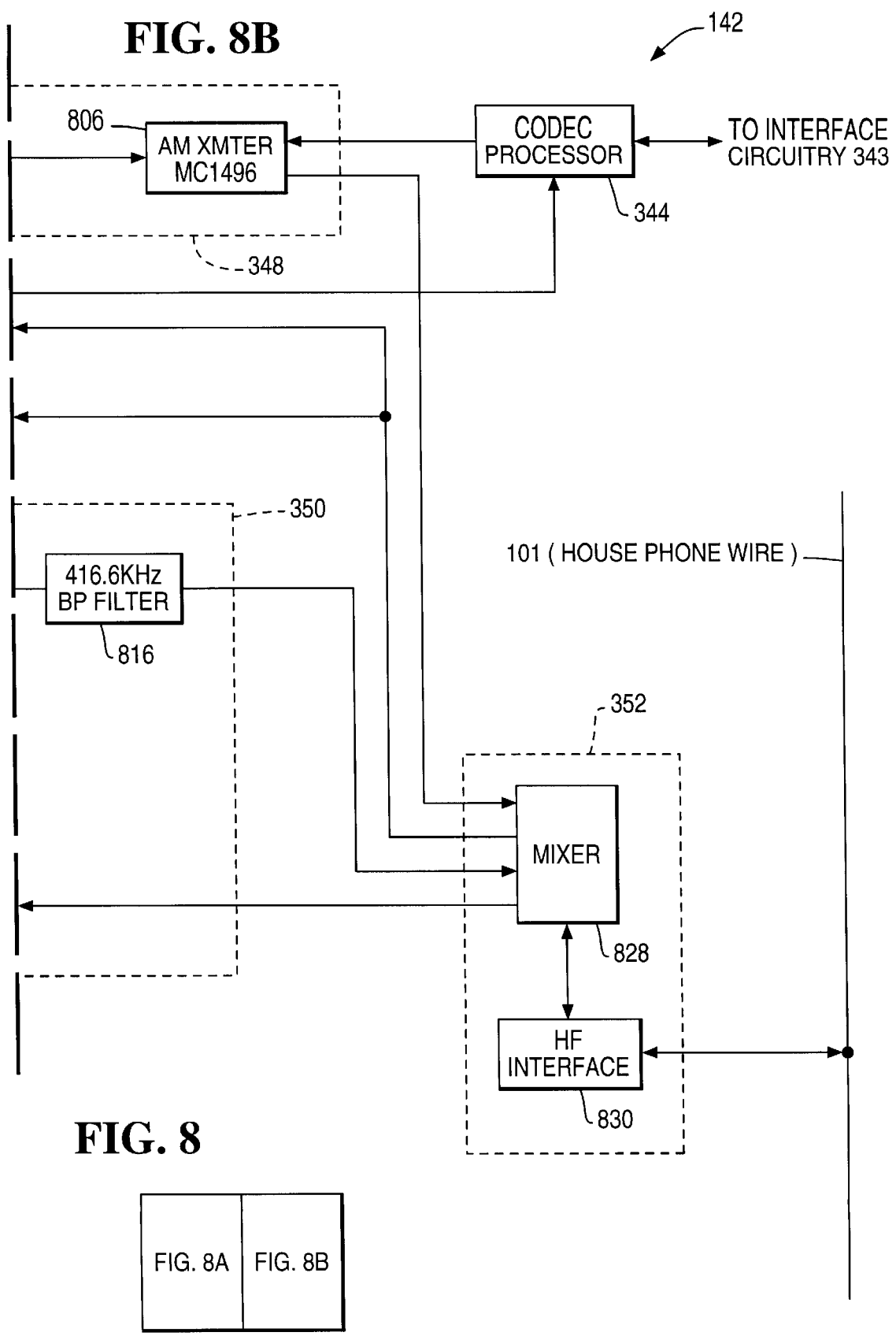

PERSONAL COMPUTER INTERACTIVE PHONE SYSTEM

CROSS REFERENCE TO RELATED APPLICATIONS

This application is a continuation-in-part of co-pending application Ser. No. 08/972,351, filed on Nov. 7, 1997, which in turn is a continuation of co-pending application Ser. No. 08/766,122, filed on Dec. 16, 1996.

BACKGROUND OF THE INVENTION

The present invention generally relates to a telephone communication system, and in particular, to a personal computer interactive phone system which utilizes existing telephone equipment and existing phone wiring.

Increasingly, many homes may have one or more telephone sets and a modern personal computer (PC). With increasing performance needs and expectations on home telephone systems, more and more consumers are demanding that the home telephone system have more intelligence and processing capabilities at an affordable price. Telephony features that consumers may find desirable in a home telephone system include: (i) caller ID announcement, (ii) voice activated auto-dial, (iii) message center access from any phone in the home, (iv) routing of incoming calls to specific phones in the home, (v) in-house intercom with no additional wiring of the home, (vi) screening of incoming messages from any phone in the home, (vii) home convenience package including list maker and scheduler, and (viii) speech recognition.

In order for a telephone system which provides the above telephony features to be marketable to consumers, the telephone system ideally would be (i) inexpensive, (ii) flexible to form a specific telephone system for a household, (iii) adaptable to existing telecommunication technology, (iv) adaptable to consumer's existing telephone equipment and house wiring, (v) simple to install, and (vi) non-interfering with regular operation of existing home telephone system.

Method and apparatus are therefore needed which may be integrated with existing telephone equipment to provide advanced telephony features to existing telephone equipment.

SUMMARY OF THE INVENTION

In accordance with one embodiment of the present invention, there is provided a phone system controller for use with a phone system adapter that selectively couples a telephone set to a telephone line. The phone system controller includes a computer system and an interactive phone system board. The computer system includes a processor and an expansion slot operable to couple an expansion card to the processor of the computer system. The interactive phone system board is coupled to the expansion slot. The interactive phone system board includes a connector operable to connect the computer system to a telephone line. Moreover, the interactive phone system board is operable to (i) establish a communication channel with the phone system adapter that permits normal concurrent use of the telephone line while the communication channel is established, (ii) receive audio signals from the telephone set, and (iii) provide the computer system with the audio signals via the communication channel.

Pursuant to another embodiment of the present invention, there is provided a telephone system for providing advanced telephony features. The telephone system includes a first phone system adapter and a phone system controller. The first phone system adapter is coupled between a first telephone handset and a telephone line. Furthermore, the first phone system adapter is operable to (i) selectively couple the first telephone handset to the telephone line, (ii) receive an oral command from the first telephone handset when the first telephone handset is decoupled from the telephone line, and (iii) transmit the oral command to the phone system controller via the telephone line while the first telephone handset is decoupled from the telephone line.

The phone system controller is coupled to the telephone line. Moreover, the phone system controller includes a personal computer system having an interactive phone system board and a computer readable medium. The computer readable medium includes programs that configure the personal computer system and the interactive phone system board to (i) receive the oral commands via the telephone line, and (ii) execute the oral command.

Pursuant to yet another embodiment of the present invention, there is provided a method of providing a telephone set with an advance telephony feature. One step of the method includes decoupling the telephone set from a telephone line. Another step of the method includes transmitting an oral command from the telephone set to a phone system adapter box coupled to the telephone line while the telephone set is decoupled from the telephone line. The method also includes the step of transmitting the oral command from the phone system adapter box to a interactive phone system board of a personal computer system via the telephone line while the telephone set is decoupled from the telephone line. Furthermore, the method includes the step of processing the oral command at the personal computer system in order to provide the advanced telephony feature.

DESCRIPTION OF THE DRAWING

The above and other features, and advantages of the present invention will become apparent from the following description and attached drawings, in which:

FIG. 1 is a block diagram of a PC interactive phone (PCIP) system, in accordance with the present invention;

FIG. 2 shows house wiring of a telephone line and installation scheme for the PC interactive phone (PCIP) system shown in FIG. 1, in accordance with the present invention;

FIG. 4 shows the user panel of FIG. 3 in greater detail;

DETAILED DESCRIPTION OF THE PREFERRED EMBODIMENT

Figure 3C:
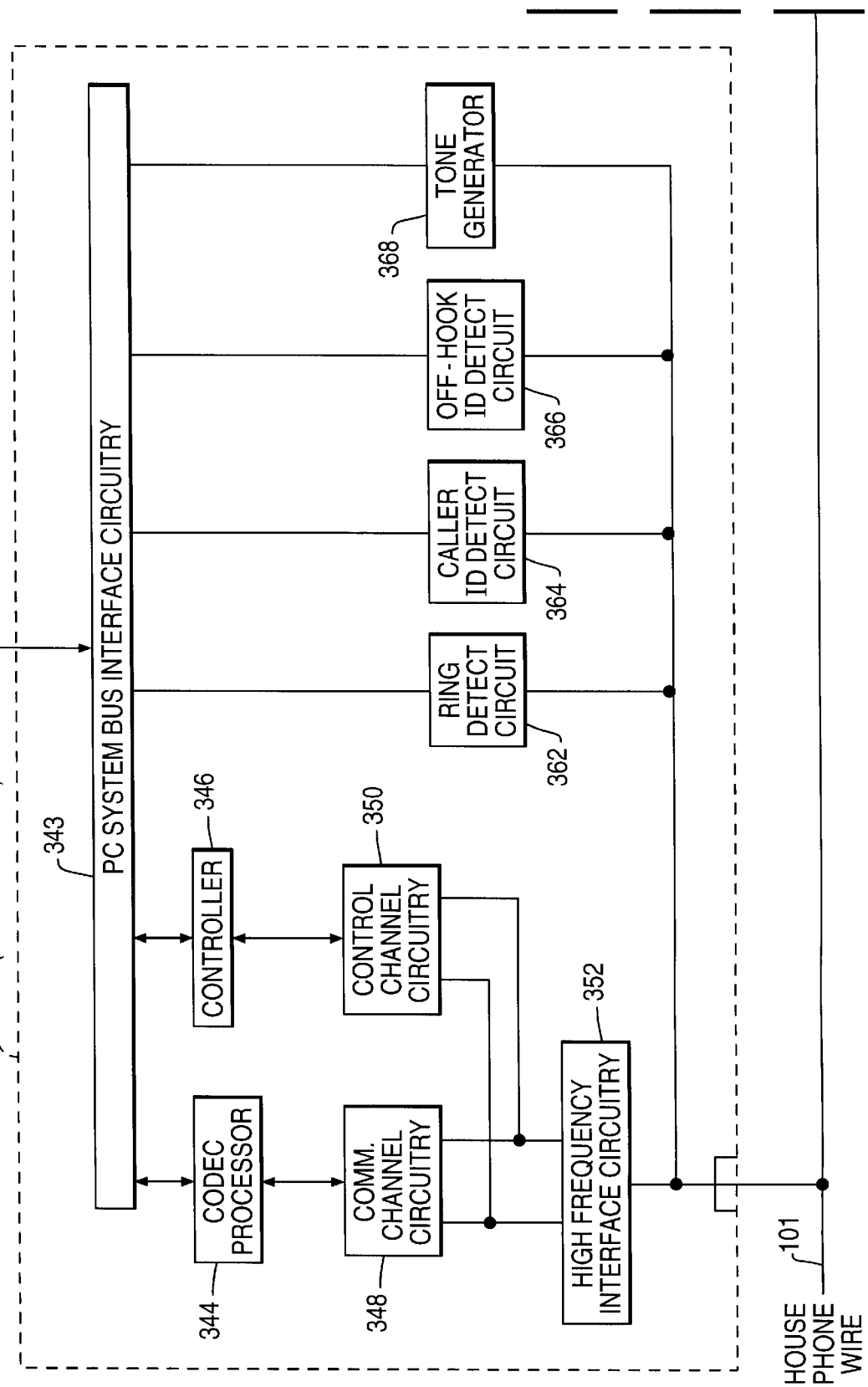
FIG. 3 (including 3A and 3B) shows the PC interactive phone (PCIP) system of FIG. 1 in greater detail, in accordance with the present invention.

The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to cover all modifications, equivalents, and alternatives falling within the spirit and scope of the invention as defined by the appended claims.

Referring to FIG. 1, there is shown a block diagram of a PC interactive phone (PCIP) system 100 which incorporates various features of the present invention. The PCIP system 100 includes a house telephone line 101, a personal computer (PC) system 141, a plurality of telephone sets 104A, 104B, . . . , 104N, and a plurality of PCIP adapters 102A, 102B, . . . , 102N. Each of the telephone sets 104A–104N is coupled to a respective PCIP adapter (PCIPA) 102A–102N. In a preferred embodiment, the telephone sets 104A–104N are implemented with standard telephone sets without any advanced features. Via the telephone network 106, each of the telephone sets 104A–104N is operable to communicate with the telephone sets 110A, 110B, . . . , or 110M.

As shown in FIG. 1, the PC system 141 includes a PC mother board 198 and an add-in PCIP link (PCIPL) board 142. Other detailed aspects of a typical PC system are not described here because they are known to the people in the art. The PCIPL board 142 is coupled to the PC mother board 198 via the PC system bus 196. An example of a typical modern system bus is the PCI local bus. The PCIPL board 142 and the plurality of PCIP adapters 102A–102N are coupled to the telephone line 101.

Referring to FIG. 2, there is shown house wiring of the telephone line 101 and installation scheme for the PCIP system 100 shown in FIG. 1. As shown in FIG. 2, the PC system 141 has a slot 142, generally allowing access for miscellaneous PC add-in boards, into which the PCIPL board 142 is inserted. The telephone line 101 is wired into rooms 1-N, where telephone jacks 203, 201A, 201B, . . . , 201N are installed, respectively. Via connector 209 and a connectorized telephone wire 208, the PCIPL board 142 is coupled to the telephone jack 203.

A plurality of adapter boxes 202A, 202B, . . . , 202N are coupled to the telephone jacks 201A–201N, respectively. The telephone sets 104A–104N are coupled to the adapter boxes 202A–202N, respectively. Installed within the adapter boxes 202A–202N are the PCIP adapters 102A–102N, respectively. Each of the adapter boxes 202A–202N has a user panel which is depicted in FIG. 4 in greater detail.

Referring to FIG. 3A (including 3B and 3C), there is shown an embodiment of the PCIP system of FIG. 1 in greater detail. Depicted in FIG. 3B as a representative of the plurality of PCIP adapters 102A–102N), the PCIP adapter 102A includes an amplifier 306, a speaker 308, a human interface circuitry 309, a relay 310, a subscriber loop interface (SLIC) 312, a controller 314, a communication channel circuitry 316, a control channel circuitry 318, and a high frequency interface circuitry 320. Coupled to the human interface circuitry 309 is a user panel 329.

The speaker 308 is coupled to the communication channel circuitry 316 via the amplifier 306. Moreover, the speaker 308 is operable to project audio to PCIP adapter locations in the home as needed by the PCIP system 100.

The SLIC 312 is coupled between the communications channel circuitry 316 and the telephone set 104A via K1 switch located within the relay 310. The SLIC 312 is operable to power the telephone set 104A to (i) detect the off-hook condition for the telephone set 104A, (ii) adjust the proper bias and amplitude of audio signals sent to and received from the telephone set 104A, (iii) adjust the proper bias and amplitude of audio signals sent to and received from the communications channel circuitry 316, and (iv) convert a 4-wire-send-andreceive signaling arrangement on the communications channel side to a 2-wire-send-and-receive signaling arrangement that is appropriate to the telephone set 104A. The off-hook detect capability within the SLIC 312 is used by the PCIP system 100 to initiate a "listen" response whenever a telephone handset is picked up. Modern SLIC circuits are highly integrated devices that can be purchased from a number of suppliers.

The relay 310 is operable to connect the telephone set 104A either to the SLIC 312 or to the telephone line 101 in order to bypassing the PCIP features of the PCIP adapter 102A.

The human interface circuitry 309 is coupled to the controller 314. The human interface circuitry 309 is operable to generate currents that light the LEDs 404, 406, and 412 on the user panel 329 in response to control signals from the controller 314. Moreover, the human interface circuitry 309 is operable to generate service request signals to the controller 314 in response to activation of the function buttons 408, 410, and 414 on the user panel 329.

The communication channel circuitry 316 of the adapter 102A is coupled to the SLIC 312. In a preferred embodiment of the present invention, the communications channel circuitry 316 includes a transmitter and a receiver which collectively provide two high frequency communication channels. The high frequency transmitter combines low frequency audio from the SLIC 312 with a high frequency carrier that can be applied to the telephone line 101 in a non-interfering manner using the high frequency interface circuitry 320. The high frequency receiver recovers low frequency audio from a high frequency carrier on the telephone line 101 and sends the low frequency audio either to (i) the SLIC 312 or (ii) the speaker 306 and the amplifier 308, depending on control signals communicated through the controller 314. The two high frequency communication channels are mainly used as a full duplex audio channel (i.e., simultaneous audio transmission and reception) to another adapter 102B–102N, or to the PCIPL board 142 of the PC system 141 via two communication channels. Depending on the various operating modes of the PCIP system 100, these two frequencies are re-configurable to support either the transmitter or the receiver functions.

Control channel circuitry 318 can encode and decode binary sequences using a third high frequency carrier signal distinct from high frequency carrier signals of the two communication channels described in the previous paragraph. The control channel circuitry 318 is connected to the controller 314 which facilitates a multi-point network using a single carrier frequency. The controller 314 has a networking port capable of transmitting and receiving Manchester encoded digital information, which eliminates the need for a separate clock signal. The controller 314 also uses a collision sensing and back-off algorithm that resolves contention for the network. The control channel can be coupled to the telephone line 101 in a non-interfering manner using high frequency interface circuitry 320. The encode side of control channel circuit 318 converts a binary "1" and "0" sequence from the controller 314 to a "carrier on" and "carrier off" sequence. The decode side of the control channel circuitry 318 converts a "carrier on" and "carrier off" sequence to a binary "1" and "0" sequence to be sent to the controller 314.

The high frequency interface circuitry 320 connects the communication channel circuitry 316 and the control channel circuitry 318 to the telephone line 101. The high frequency interface circuitry 320 is operable to couple the high frequency carrier signals from the communication circuitry 316 and the control channel circuitry 318 to the telephone line 101, without interfering the normal audio band signal transmission on the telephone line 101. The high frequency interface circuitry 320 is also operable to receive high frequency signals from the telephone line 101.

The controller 314 is specialized for implementation of distributed sense and control networks. It includes a networking port, a configurable input/output port, and hardware and firmware that allow execution of simple programs for sense and control and communications protocols. The input/output port provides access to the human interface circuitry 309 and controls various communications path options within the PCIP adapter 102A. In particular, the input/output port is operable to (i) control the states of the relay 310 (energized or un-energized), (ii) generate signals to light the LEDs 404, 406, and 412 on the user panel 329, (iii) detect a button activation on the user panel 329, (iv) monitor the off-hook detect signal from the SLIC 312, and (v) switch the communication channel receiver output between speaker amplifier 306 and the SLIC 312. The networking port that is integrated into the controller 314 enables the controller 314 to send and receive control commands from the PC system 141. For example, the networking port enables the controller 314 to send a service request to the PC system 141 after a specific button on the user panel 329 has been activated. Specifically, the controller 314 networks with the PC system 141 and other PCIPA controllers 314 using data packets across the control channel. The Manchester encode and decode circuits that generate and sense the "1" and "0" bits are also integrated into the controller 314. The controller 314 also has a collision detect and back-off algorithm that resolves contention and allows multi-node access to the control channel. In a preferred embodiment the controller 314 is implemented with Lon Works Neuron chip, MC143120, available from Motorola and Toshiba.

As shown in FIG. 3C, the PCIPL board 142 includes a PC system bus interface circuitry 343, a CODEC (coder/decoder) 344, a controller 346, a communication channel circuitry 348, a control channel circuitry 350, a high frequency interface circuitry 352, a ring detect circuit 362, a Caller ID detect circuitry 364, an off-hook detect circuit 366, and tone generator 368. The PC system bus interface circuitry 343 is coupled to PC system bus 196 and is operable to transmit signals between the PC system bus 196 and the other components of the PCIPL board 142.

The CODEC 344 is coupled to PC bus system bus interface circuitry 343. The CODEC 344 is operable to convert digitally encoded audio from the PC system bus 196 to analog audio and send the converted digital audio to the communication channel circuitry 348. The CODEC 344 is also operable to convert analog audio from communication channel circuitry 348 to digital audio and send the converted analog audio to the PC system 141.

The controller 346 is similar to the controller 314 of the PCIP adapter 102A. The controller 346 is specialized for implementation of distributed sense and control networks. The controller 346 includes a networking port, a configurable input/output port, and hardware and firmware that allow execution of simple programs for sense and control and communications protocols. The input/output port in this case connects to the PC system bus interface circuit 343 and provides a parallel port for communicating with the PC system 141. The controller 346 is coupled between the PC system bus interface circuitry 343 and the control channel circuitry 350, and is thus operable to provide network access for the PC system 141 to generate control commands to, and interpret service requests and operational reports from, the adapters 102A–102N.

On the PCIPL board 142, the communication channel circuitry 348 has two high frequency communication channels, which are mainly used to flexibly establish full duplex audio channels between the CODEC 344 and the PCIP adapters 102A–102N. In a preferred embodiment, only one PCIP adapter 102A–102N is allowed to transmit on either of the two communication channels at any time as controlled by the PCIP control program 602. The function and structure of the communication channel circuitry 348 are similar to those of the communication channel 316 in the above-described PCIP adapter 102A.

The control channel circuitry 350 provides a control channel that is mainly used to (i) send control commands to the PCIP adapters 102A–102N, and receive service requests and operational reports from the PCIP adapters 102A–102N. The function and structure of the control channel circuitry 350 are similar to those of the control channel circuitry 318 in the above-described PCIP adapter 102A.

The high frequency interface circuitry 352 connects the communication channel circuitry 348 and the control channel circuitry 350 to the telephone line 101. The high frequency interface circuitry 352 is operable to couple the high frequency signals from the communication channel circuitry 348 and the control channel circuitry 350 to the telephone line 101, without interfering with the normal audio band signal transmission on the telephone line 101. The high frequency interface circuitry 352 is also operable to receive high frequency signals from the telephone line 101.

The ring detect circuit 362 is operable to detect ring currents on the telephone line 101.

The caller ID detect circuit 364 is operable to detect caller identification information (e.g. a caller's telephone number). Conventionally, caller identification information is carried between a first ring current and a second ring current of an incoming call when caller ID service has been purchased from a local phone company.

The Off-hook detect circuit 366 is operable to detect a change in line impedance associated with an off-hook condition. Three examples of off-hook conditions are: (i) any of the non-PCIP equipped telephones connected to the telephone line 101 has the handset lifted, (ii) any of the PCIP equipped telephone sets 104A–104N has the handset lifted and the relay 310 has the telephone set 104A–104N connected to the telephone line 101, and (iii) any other equipment on the telephone line 101 such as a FAX or an answering machine "picks up" a call.

The tone generator 368 is to operable to convert a telephone number to be dialed from a computer based representation, such as binary, into DTMF (dual tone multifrequency) tones that can be superimposed onto the telephone line 101 to affect autodialing.

The ring detect circuit 362, the Caller ID detect circuit 364, the Off-hook detect circuit 366 are well known to the those skilled in the art. Thus, the ring detect circuit 362, the Caller ID detect circuit 364, and the Off-hook detect circuit 366 will not be described in greater detail. The functions of the CODEC 344 and the tone generator 368 can be flexibly programmed into various digital signal processors (DSPs) available in the industry, an example of which is the DSP 1634 processor made by AT&T.

It should be noted that, in the embodiment shown in FIG. 3A, the three frequencies that are used to implement the communication channels and the control channel in the PCIP system 100 are out of the audio voice band and are in compliance with FCC rules, such that, the signaling of these three channels does not interface with normal communication and signaling on a telephone network 106, even when PCIP system 100 and normal telephone activities are in progress simultaneously.

Preferably, in the embodiment shown in FIG. 3A, 312.5 KHz and 357.1 KHz are used for two communication channels and 416.7 KHz for one control channel. These three specific frequencies are chosen because they are between 540 KHz (the bottom of the AM broadcast band) and 270 KHz (the lowest frequency that can be used for compliance to part 68 Federal Communication Commission). These three frequencies are also multiples of 10 MHz, which makes them easy to generate without RC or L tunables.

In the embodiment as shown in FIG. 3A, a communication channel between the adapter 102A and the PCIPL board 142 is formed by: the PCIPA communication channel circuitry 316, the PCIPA high frequency interface circuitry 320, the telephone line 101, the PCIPL high frequency interface circuitry 352, and the PCIPL communication channel circuitry 348. A control channel between the adapter 102A and the PCIPL board 142 is formed by: the PCIPA control channel circuitry 318, the PCIPA high frequency interface circuitry 320, the telephone line 101, the PCIPL high frequency interface circuitry 352, and the PCIPL control channel circuitry 350.

Unlike the conventional telephone communication system, the present invention uses two communication channels to achieve full duplex audio. In the conventional telephone communication, one set of wires achieves full duplex audio by using a hybrid transformer that separates transmitting from receiving in a telephone set. However, the method used in the conventional telephone communication is not feasible when audio is modulated on an out of voice band carrier signal, because, if both ends of a communication channel used the same carrier signal, the result would be scrambled unrecoverable signals.

In addition, unlike the conventional telephone communication system where a telephone office is usually either in audio transmission mode or in controlling mode (such as on-hook or off-hook signaling), the features provided by the PCIP adapters 102A–102N and the PCIPL board 142 sometimes need to process audio transmission and control signals at the same time when multiple telephone sets 104A–104N connected to the telephone line 101 are in use at the same time. Thus, in the PCIP adapter 102A and the PCIPL board 142, the communication channels are separated from the control channel.

In the embodiment shown in FIG. 3A, the existing house telephone wiring is used as transmission medium for the three high frequency channels between the adapters 102A–102N and the PCIPL board 142. However, other transmission media can be used to implement these three channels, such as wireless or power line carrier.

Referring to FIGS. 3E and 3F of composite FIG. 3D, there is shown another embodiment of the PC interactive phone (PCIP) system of FIG. 1 in greater detail. In particular, FIG. 3E depicts another embodiment of the adapter 102A which has similar structure to the embodiment depicted in FIG. 3B, except that the high frequency interface circuitry 320 of the adapter 102A in FIG. 3B is replaced by wireless communication interface circuitry 396 and an antenna 397 in the embodiment of FIG. 3E. Moreover, FIG. 3F depicts another embodiment of the PCIPL board 142 which has similar structure to the embodiment shown in FIG. 3C, except that the high frequency interface circuitry 352 of the PCIPL board 142 of FIG. 3B is replaced by wireless communication interface circuitry 398 and an antenna 399 in the embodiment of FIG. 3F. Thus, only PCIPA wireless communication interface circuitry 396 and PCIPL wireless communication interface circuitry 398 will be further described.

Wireless communication interface circuitry 396 and 398 are operable to implement a duplex communication link using two carrier signals at a different frequencies between any two PCIPAs 102A–102N or between one PCIPA 102A–102N and the PCIPL board 142. Moreover, the wireless communication interface circuitry 396 and 398 are operable to implement a multipoint control channel on a third carrier signal at a third carrier frequency. The communication link technology is common in the industry, as in cordless phone technology. However, specific control must be exerted to prevent more than one transmitter at a time on one frequency. The multi-point control link is implemented as a single frequency that is modulated "on" or "off" for Manchester encoded signaling by any of the PCIPL board 142 or the PCIP adapters 102A–102N., Multi-point networking is possible because each PCIPL board 142 and PCIP adapter 102A–102N implements a collision detect and back-off algorithm as in the wired approach.

In the embodiment shown in FIG. 3D, the communication between the adapter 102A and the PCIPL board 142 is through wireless carrier, instead of the telephone line 101. In FIG. 3D, a communication channel between the adapter 102A and the PCIPL board 142 is formed by: the PCIPA communication channel circuitry 316, the PCIPA wireless communication interface circuitry 396, the PCIPL wireless communication interface circuitry 398, and the PCIPL communication channel circuitry 348. A control channel between the adapter 102A and the PCIPL board 142 is formed by: the PCIPA control channel circuitry 318, the PCIPA wireless communication interface circuitry 396, the PCIPL wireless communication interface circuitry 398, and the PCIPL control channel circuitry 350. Like the PCIP adapter 102A, each of the other PCIP adapters 102B–102N also has a communication channel and a control channel to the PCIPL board 142.

Referring to FIG. 4, there is shown a user panel 329 (which is mounted on the front of adapter box 202A) in greater detail, in accordance with the present invention. As shown in FIG. 4, the user panel 329 includes a speaker opening 402, three LEDs (404, 406, 412), and three buttons (408, 410, 414). The LED 404, which is associated with the label "PC" and button 408, indicates whether a communications link has been established between the attached telephone set 104A and the PC system 141, as would be the typical case after pressing button 408. The LED 406, which is associated with the label "LINE" and button 410, indicates whether the telephone set 104A is directly connected to the telephone line 101, as would be the typical case after pressing button 410. The LED 412, which is associated with the label "INTERCOM" and button 414, indicates whether the intercom feature can be used, as would be the typical case after pressing button 412.

In the idle state, the PC system 141 is on; the PCIPL board 142 is active; and the relay 310 connects the telephone set 104A to the SLIC 312 so that when the handset of telephone set 104A is picked up, the LED 404 turns on and a user can speak service request to the PC system 141 immediately without speaking over a dialtone sound. By pressing button 410, the user can over-ride the default condition, which causes the relay 310 to directly connect the telephone set 104A to the telephone line 101 and enables the user to dial a telephone number manually. The relay 310 is controlled by a PCIP control program 602 (see FIG. 6) and firmware in controller 314, which are responsive to button pushes, off-hook conditions, system state, and resource availability, such as availability of the audio communication channels. Some functions of PCIP control program 602 are distributed such that some control is in the various PCIP adapters (e.g. 102A–N). If the PC system 141 is turned off or otherwise not responding, the controller 314 will control the relay 310 to directly connect the telephone set 104A to the telephone line 101.

Figure 5:
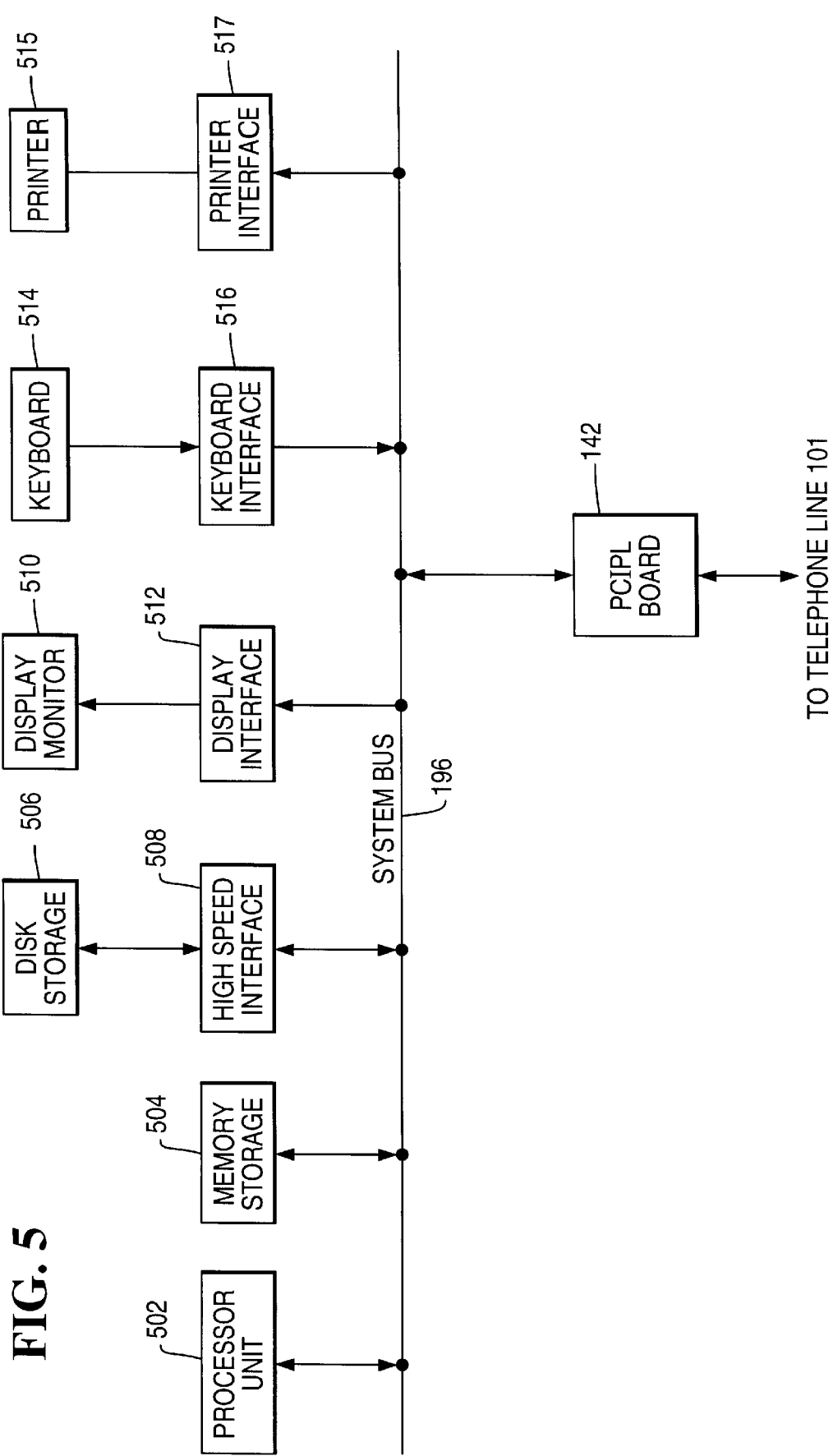
FIG. 5 shows a PC system that can be used to control the operation of the PCIP system of FIG. 1, in accordance with the present invention.

Referring to FIG. 5, there is shown the PC system 141 of FIG. 1 in greater detail. As shown in FIG. 5, the PC system 141 includes a system bus 196, a processor unit 502, a memory storage 504, a disk storage 506, a high speed interface 508, a display monitor 510, a display interface 512, a keyboard 514, a keyboard interface 516, a printer 515, and a printer interface 517.

Memory storage 504 is coupled to the system bus 196 and is operable to store programs that consist of instructions and data. Disk storage 506 is coupled to the system bus 196 via high speed interface 508 and is also operable to store programs. However, the disk storage 506 has a larger memory size than the memory storage 504, while the memory storage 504 has a faster access speed than the disk storage 506. In a preferred embodiment, the programs stored in the disk storage 506 are downloaded to the memory storage 504.

The processor unit 502 is coupled to the system bus 196 and has access to both the memory storage 504 and the disk storage 506. To perform a specific task, the processor unit 502 is operable to execute the programs stored in the memory storage 504. The processor unit 502 is also operable to control the overall operation of the PC system 141.

The display monitor 510 is coupled to the system bus 196 via display interface 512. The display monitor 510 is operable to provide a visual interface between a user and the PC system 141.

The keyboard 514 is coupled to the system bus 196 via a keyboard interface 516. The keyboard 514 is operable to provide alphabetical and numerical input to the PC system 141. The printer 515 is coupled the system bus 196 via a printer interface 517. The printer 515 is operable to print out results.

Figure 6:
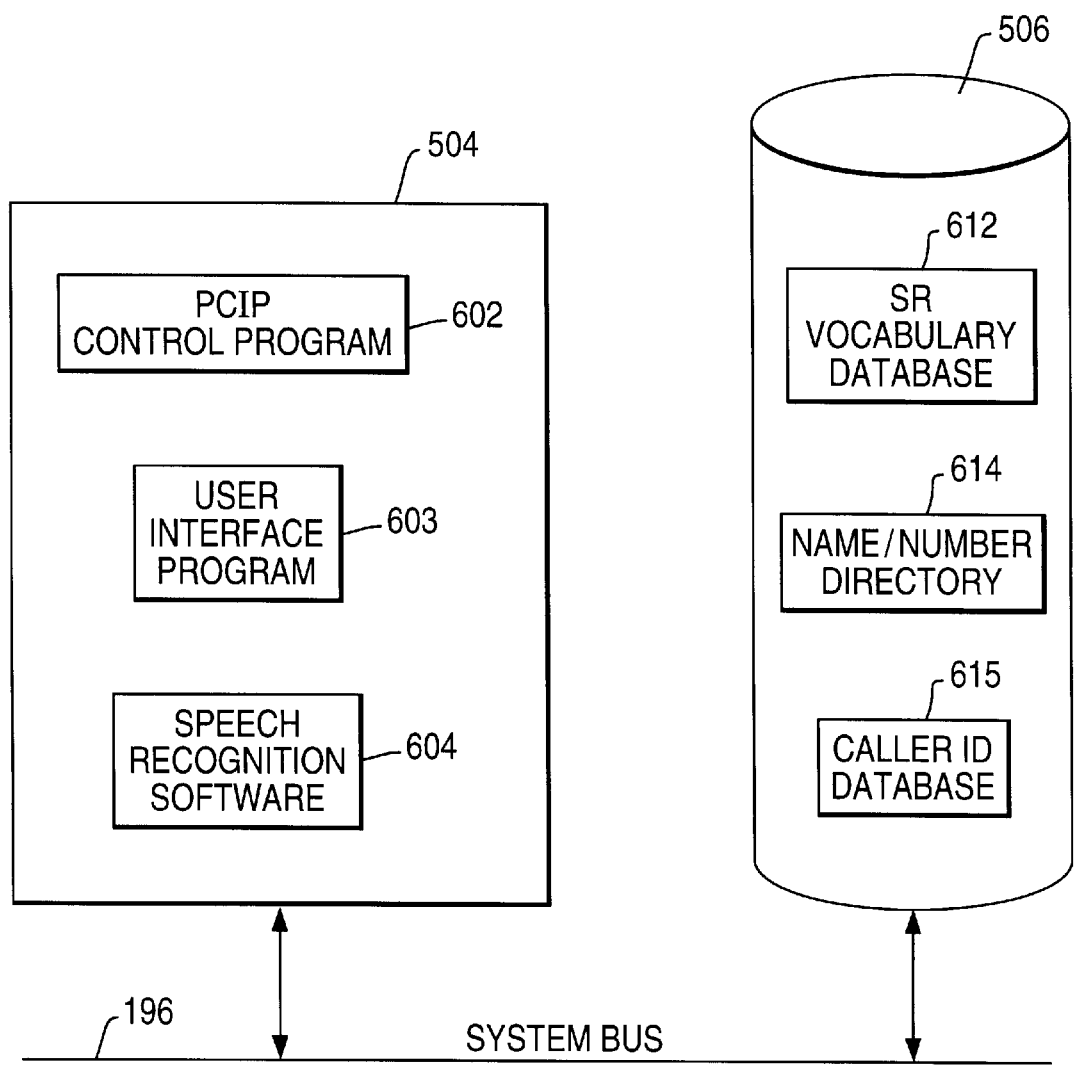
FIG. 6 shows the programs stored in memory storage and disk storage in FIG. 5.

Referring to FIG. 6, there is shown the executable programs stored in the memory storage 504 during execution and the database files maintained in the disk storage 506. As shown in FIG. 6, the executable programs stored in memory storage 504 include: a PCIP control program 602, a user interface program 603, and speech recognition software 604. The database files stored in disk storage 506 include: a speech recognition (SR) vocabulary database 612, a Name/Number directory 614, a Caller ID database 615, and a PCIPA location directory 616.

The PCIP control program 602 is operable configure the processor unit 502 to maintain state information for the system and orchestrate responses to various stimuli. Stimuli include button pushes, off-hook conditions, ring detections, etc. Responses include initiating database lookups, sending out control commands for establishing communication connections, etc. For example, if a PCIP adapter connected telephone is placed in an off hook condition, the control program 602 will cause the processor unit 502 to generate and transmit commands on the control channel in order to establish a communication channel with the PCIP adapter connected telephone. Furthermore, the control program 602 will cause the processor unit 502 to execute speech recognition software 604 in order to "listen" to the appropriate communication channel. Specific examples are provided in the discussion of the flowcharts below.

Speech recognition software 604 is widely available. The PCIP system 100 in the present invention does not require a particularly sophisticated capability. An example of an ASR application is WILDFIRE (call 800.WILDFIR for a practical demonstration and additional information). Examples of how speech recognition software 604 is used in the PCIP system 100 are provided in the discussion of the flowcharts below.

The SR vocabulary database 612 contains the digital representation of audio clips (in this case, spoken words relating to commands and names) that can be interpreted by the processor unit 502 in executing the speech recognition software 604. These digital representations are frequently referred to as wavefiles. The use of wavefile formats is common in the industry.

The user interface program 603 cause the PC system 141 to provide a human interface via the display monitor 510, the keyboard 514 and the mouse 515. The user interface program 603 enables a user to install, configure, and customize his/her PCIP system 100. This is a typical capability for PC add-in software and hardware and will not be discussed further.

The Name/Number directory 614 stores persons' names and associated telephone numbers.

The Caller ID database 615 stores a caller's "signature" pattern recovered from the Caller ID information along with an announcement wavefile and call routing options and ring pattern options. The announcement wavefile is pre-recorded by the user, and stored in a digital format. The call routing options and ring pattern options are entered via user interface program 603.

The PCIPA location directory 616 stores PCIP adapter's identifications (ID) and respective locations. Whenever a PCIP adapter (102A, 102B, . . . , or 102N), which initiates an intercom operations, sends an information data packet to the PCIPL board 142, the PCIP adapter also sends its own PCIPA ID, together with the information packet. By mapping the ID received from the PCIP adapter into a location in the PCIPA location directory 616, the PCIP control program 602 can set an audio channel and a control channel for the PCIP adapter.

In a preferred embodiment, the databases and data in the disk storage 506 are read into the memory storage 504, updated in the memory storage 504, and written back to the disk storage 506.

Figure 7A:
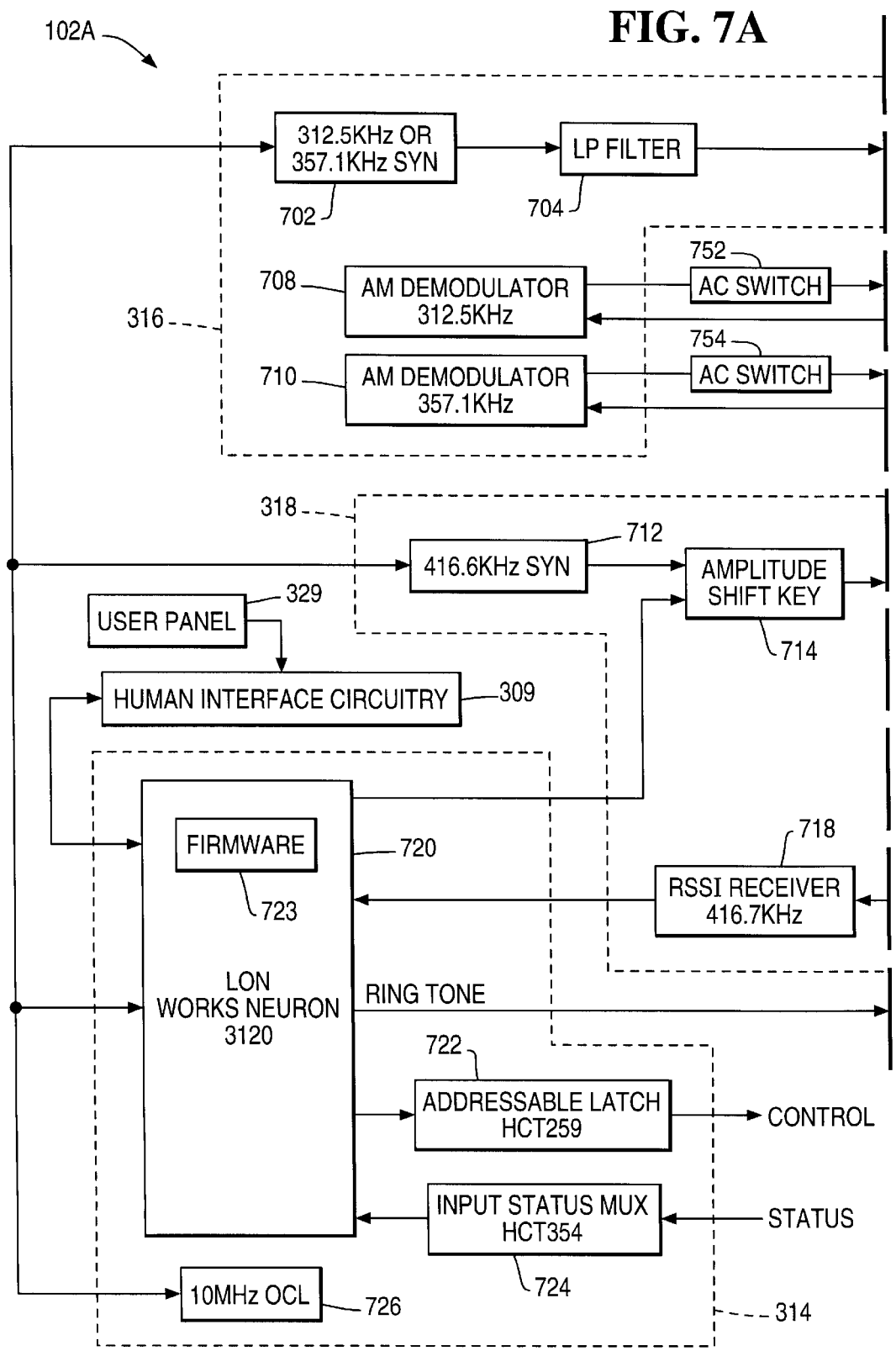
FIG. 7 (consisting of FIGS. 7A and 7B) shows a representative of the PCIP adapters shown in FIG. 3B, in greater detail.

Referring to FIG. 7 (consisting of FIGS. 7A and 7B), there is shown the PCIP adapter 102A (see FIG. 3B), where the details for each of the function blocks of PCIP adapter 102A are delineated by dotted lines, in accordance with one embodiment of the present invention. As shown in FIG. 7, the PCIP adapter 102A further includes four AC switches (752, 754, 756, and 758). The AC switch 752 is operable to switch on and off the output from AM demodulator 708, the AC switch 754 is operable to switch on and off the output from AM demodulator 710, the AC switch 756 is operable to switch on and off the input to the SLIC 312, and the AC switch 752 is operable to switch on and off the input to the amplifier 306. In a preferred embodiment, the four AC switches 752, 754, 756, and 758 are implemented with 74HC/HCT4016 switches manufactured by Signetics.

As shown in FIG. 7A, PCIPA high frequency interface circuitry 320 includes a mixer 728 and an HF interface 730. The mixer 728 is operable to combine the high frequency signals received from the communication channel circuitry 316 and the control channel circuitry 318. Moreover, the mixer 728 is operable to provide the combined signal to the HF interface 230. The HF interface 230 is operable to apply the combined signal received from the mixer 728 to the telephone line 101.

The PCIPA controller 314 includes a processor 720, an addressable latch 722, an input status MUX 724, and a 10 MHz oscillator 726. The processor 720 is operable to decode the command signals received from an RSSI receiver 718 of the control channel circuitry 318, and generate control signals accordingly to control the operation of the PCIP adapter 102A. The processor 720 is also operable to generate status signals for the PCIP adapter 102A and the telephone set 104A, and send the status signals to the PCIPL board 142 via an amplitude shifkey 714 of the control channel circuitry 318. The processor 720 is further operable to generate request signals in response to the input signals received from human interface circuitry 309, and send the request signals to PCIPL board 142 via the amplitude shifkey 714.

As shown in FIG. 7, the processor 720 in a preferred embodiment is implemented with a Lon Works Neuron 3120 made by Motorola and Toshiba which is a low cost controller and network interface chip. Since the Lon Works Neuron 3120 has only four outputs and four inputs, the addressable latch 722 is used to expand the four outputs into eight outputs, and the input status mux 724 is used to expand the four inputs to eight inputs. Among the eight outputs of addressable latch 722, three outputs are used to control the LEDs on user panel 329; two outputs are used to control the relay 310 (since two outputs are used, more than one relay could be used) in the PCIP adapter 102A; two outputs are used to control the AM transmitter 706 (whether to transmit modulated signals), the AM demodulators 708 and 710 (whether to demodulate received signals). The AM transmitter 706 is started by turning the modulation frequency on by using the carry input to counter 702 generating the modulation frequency and off by disabling counter 702. The outputs of the AM demodulators 708 and 710 are gated to the desirable destinations by the AC switches 752 and 754.

Among the eight inputs of the status mux 724, three inputs are used to receive the signals generated by the activation of the buttons on user panel 329; one input is used to receive a line off signal from the SLIC 312; one input is used to receive a line off signal from telephone set 104A when the telephone set 104A is dis-coupled from the SLIC 312; the remaining three inputs are unused. In a preferred embodiment, the addressable latch 722 is implemented with an integrated circuit HCT 259 made by Texas Instrument. Moreover, the input system mux 724 is implemented with an integrated circuit HCT354 also made by Texas Instrument.

The Lon Works Neuron 3120 chip contains firmware 723 which causes the Lon Works Neuron 3120 chip to interpret commands from the control channel circuitry 318, scan the human interface circuitry 309 for commands, and executes the commands by (i) writing a bit into the addressable latch 722, or (ii) transmitting a command on the control channel via the control channel circuitry 318. The Lon Works Neuron 3120 chip has a unique identification (or address). When the PCIP adapter 102A sends any signals to the PCIPL board 142 (or PC system 141), the unique identification is also sent to PCIPL board 142, so that the PCIPL board 142 (or PC system 141) knows from which of the PCIPL adapters (102A, 102B, . . . , or 102N) the signals have been sent. When the PCIPL board 142 (or PC system 141) sends any signals to any of the PCIP adapters (102A, 102B, . . . , or 102N), an identification for the Lon Works Neuron chip of the respective PCIP adapter 102 is also sent with the signals. Even if all the PCIP adapters (102A, 102B, . . . , 102N) receive the signal from PCIPL board 142 (or PC system 141), only the PCIP adapter matching the identification acts upon the signals. The Lon Works Neuron 3120 chip is operable to recognize a broadcasting identification (or an broadcasting address) used to identify a PCIPL board 142 or PCIP adapter (102A, 102B, . . . , 102N) to all of the PCIP adapters 102 in the PCIP system 100.

The oscillator 726 generates a base frequency for the counters 702 and 712, and provides a clock signal for the processor 720.

In the embodiment shown in FIG. 7, the SLIC 312 is implemented with a L7551 manufactured by Seimens.

The PCIPA communication channel circuitry 316 includes a frequency counter 702, an LP (low pass) filter 704, an AM (amplitude modulation) transmitter 706, a 312.5 kHz AM demodulator 708, and a 357.1 kHz AM demodulator 710. In combination, the frequency counter 702, the LP filter 704 and the AM mixer 706 are operative as an AM transmitter. Specifically, the frequency counter 702 is operable to receive a 10 MHz signal from the oscillator 726 and divide the 10 MHz signal down to a 312.5 kHz or 357.1 kHz signal. The LP filter 704 is operable to receive the divided signal from the frequency counter 702 and convert the divided signal into a sine wave. In a preferred embodiment, the LP filter 704 is implemented with a MC1496 integrated circuit manufactured by Motorola. The AM transmitter 706 is operable to receive the sine wave from the LP filter 704 and audio from SLIC 312 and combine them into an AM modulated audio signal.

In combination, the 312.5 kHz AM demodulator 708, and the 357.1 kHz 312.5 kHz demodulator 710 are operative as an AM receiver. Specifically, the AM demodulator 708 and the AM demodulator 710 are operable to receive modulated audio signals from the mixer 728, demodulate the audio signal, and send the demodulated audio signal to the SLIC 312. The two demodulators 708 and 710 are used so that when in intercom mode either frequency can be used to receive audio signals.

The PCIPA control channel circuitry 318 includes a 416.6 kHz counter 712, an amplitude shift key 714, a 416.6 kHz BP (band pass) filter 716, and a RSSI (Received Signal Strength Indicator) 416.7 kHz receiver 718. In combination, the 416.6 kHz counter 712, the amplitude shift key 714 and the 416.6 kHz BP filter 716 are operative as an ASK (amplitude keyed shift) transmitter. Specifically, the counter 712 is able to divide the 10 MHz signal received from the oscillator 726 into a 416.6 kHz signal and send the divided signal to the amplitude shift key 714. The carry input of the counter 712 is used to key the ASK transmitter off and on. (The carry input, or "look ahead" carry, will stop and start the counter). In response to receiving a control signal from the processor 720, the amplitude shift key 714 is operable to convert the control signal into a square wave form. The 416.6 kHz BP (band pass) filter 716 is operable to convert the square wave into sin wave form.

The RSSI 416.7 kHz receiver 718 is operable to demodulate the amplitude shift keying signal received from the control channel into digital format.

Figure 8A:
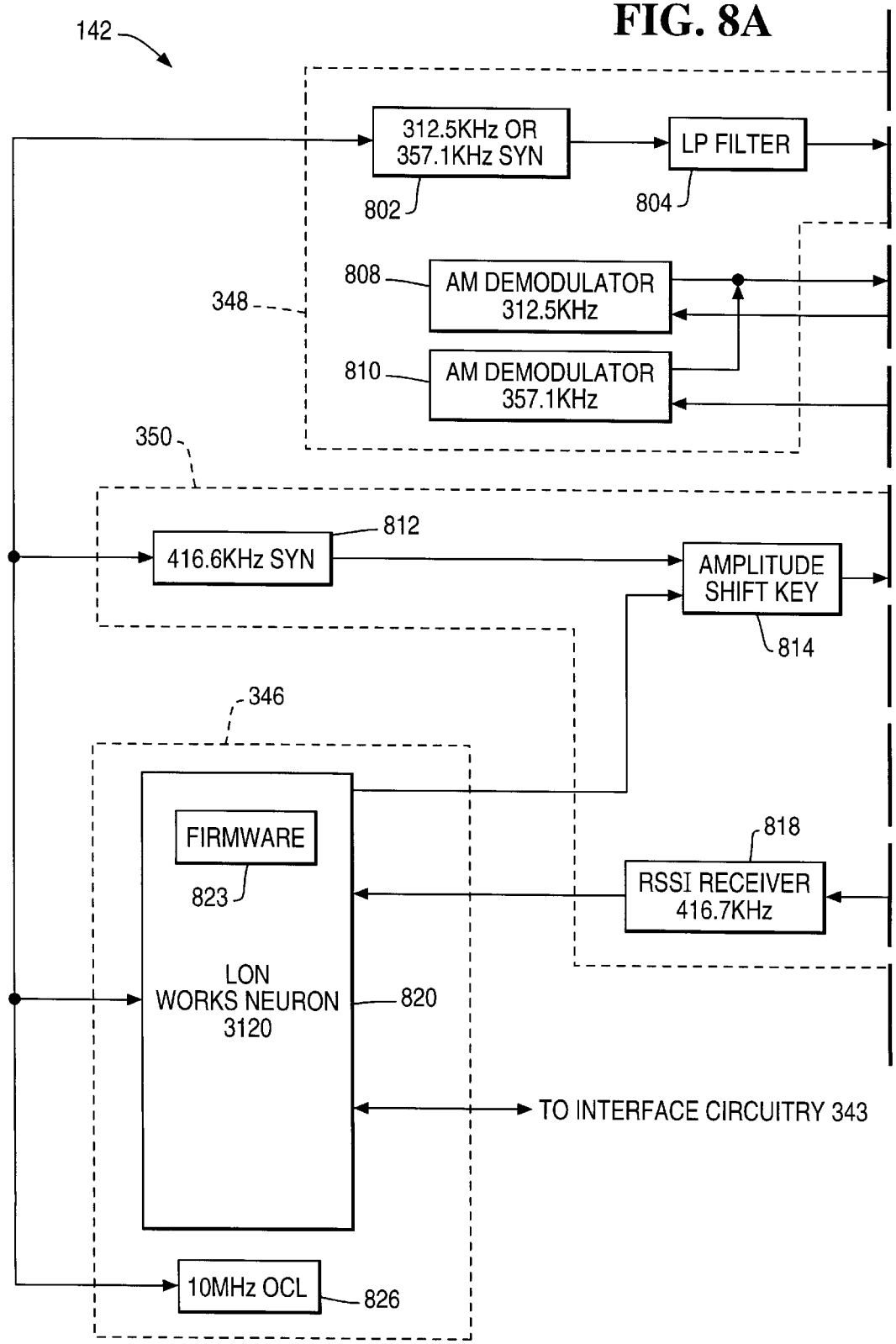
FIG. 8 (consisting of FIGS. 8A and 8B) shows PCIPL board 142 shown in FIG. 3C, in greater detail.

Referring to FIG. 8 (consisting of FIGS. 8A and 8B), there is shown the block diagram of the PCIPL board 142 (see FIG. 3C), where the details for each of the function blocks of the PCIPL board 142 are delineated by dotted lines, in accordance with one embodiment the present invention. As shown in FIG. 8, the PCIPL high frequency interface circuitry 352 includes a mixer 828 and an HF interface 830. The mixer 828 is operable to combine the high frequency signals received from the communication channel circuitry 348, and HF interface 230 connects the high frequency signals to telephone line 101.

The PCIPL controller 346 includes a processor 820 and a 10 MHz oscillator 826. The processor 820 is operable to decode command(s) received from PC system bus interface circuitry 343 into control signals, and sends the control signals to the amplitude shift key 814. The processor 820 is further operable to receive status signals and request signals from the control channel circuitry 350, decode the status and request signals, and send the decoded signals to PC system 141 via the PC system bus interface circuitry 343. Based on the status signals, the PC system 141 tracks the operational conditions of all PCIP adapters (102A, 102B, . . . , 102N) and all telephone sets (104A, 104B, . . . , 104N) of the PCIP system 100. As shown in FIG. 8A, the processor 820 in a preferred embodiment is implemented with a Lon Works Neuron 3120 made by Motorola and Toshiba which is a low cost controller and network interface chip. The Lon Works Neuron 3120 chip contains firmware 823 which causes the Lon Works Neuron 3120 chip to interpret commands from the control channel circuitry 350 and the PC system bus interface circuitry 343 and to execute the interpreted commands. As discussed above in conjunction with the PCIP adapter 102A, the Lon Works Neuron 3120 chip on the PCIPL board 142 has a unique identification (or address).

The PCIPL communication channel circuitry 348 includes a frequency counter 802, an LP (low pass) filter 804, an AM (amplitude modulation) transmitter 806, a 312.5 kHz AM demodulator 808, and a 357.1 kHz AM demodulator 810. In combination, the frequency counter 802, the LP filter 804 and the AM mixer 806 are operative as an AM transmitter. Specifically, the frequency counter 802 is operable to receive a 10 MHz signal from the oscillator 826 and divide the 10 MHz signal down to a 312.5 kHz or 357.1 kHz signal. The LP filter 804 is operable to receive the divided signal from the frequency counter 802 and convert the divided signal into a sine wave. The AM transmitter 806 is operable to receive the sine wave from the LP filter 804 and signals from the PC system 141 (via CODEC processor 344) and combine the signals into an AM modulated audio signal. In a preferred embodiment, the AM transmitter 806 is implemented with a MC1496 integrated circuit manufactured by Motorola.

In combination, the 312.5 kHz AM demodulator 808, and the 357.1 kHz 312.5 kHz demodulator 810 are operative as an AM receiver. Specifically, the 312.5 kHz AM demodulator 808 and the 357.1 kHz AM demodulator 810 are operable to receive modulated audio signals from the mixer 828, demodulate the audio signals, and send the demodulated audio signals to the CODEC processor 344. The two demodulators 808 and 810 are used because it is simpler and less costly to have two demodulators at two separate frequencies than to have one that can switch between two frequencies.

The PCIPL control channel circuitry 350 includes a 416.6 kHz counter 812, an amplitude shift key 814, a 416.6 kHz BP filter 816, and a RSSI 416.7 kHz receiver 818. In combination, the 416.6 kHz counter 812, the amplitude shift key 814, and the 416.6 kHz BP filter 816 are operative as an ASK transmitter. Specifically, the counter 812 is operable to divide a 10 MHz signal received from the oscillator 726 into a 416.6 kHz signal and send the divided signal to the amplitude shift key 814. The carry input of the counter 812 is used to key the ASK transmitter off and on. In response to receiving signals from processor 820, the amplitude shift key 814 is operable to convert the signals into a square wave form. The 416.6 kHz BP filter 816 is operable to convert the square wave into a sine wave form.

The RSSI 416.7 kHz receiver 818 is operable to demodulate the amplitude shift keying signals received from the control channel into digital format.

It should be appreciated that, in the present invention, audio signals can be transmitted between the PC system 141 and each of the PCIP adapters (102A, 102B, . . . , 102N) via the communication channel without interfering the voice band signals on the telephone line 101. And control signals can be transmitted between the PC system and each of each of the PCIP adapters (102A, 102B, . . . , 102N) via the control channel without interfering the voice band signals on the telephone line 101. In addition, the audio and control signals can be transmitted between two of the PCIP adapters (102A, 102B, . . . , 102N) via a respective communication and control channels without interfering the voice band signals on the telephone line 101.

Auto Dial Operation of the PCIP System

Figure 9:
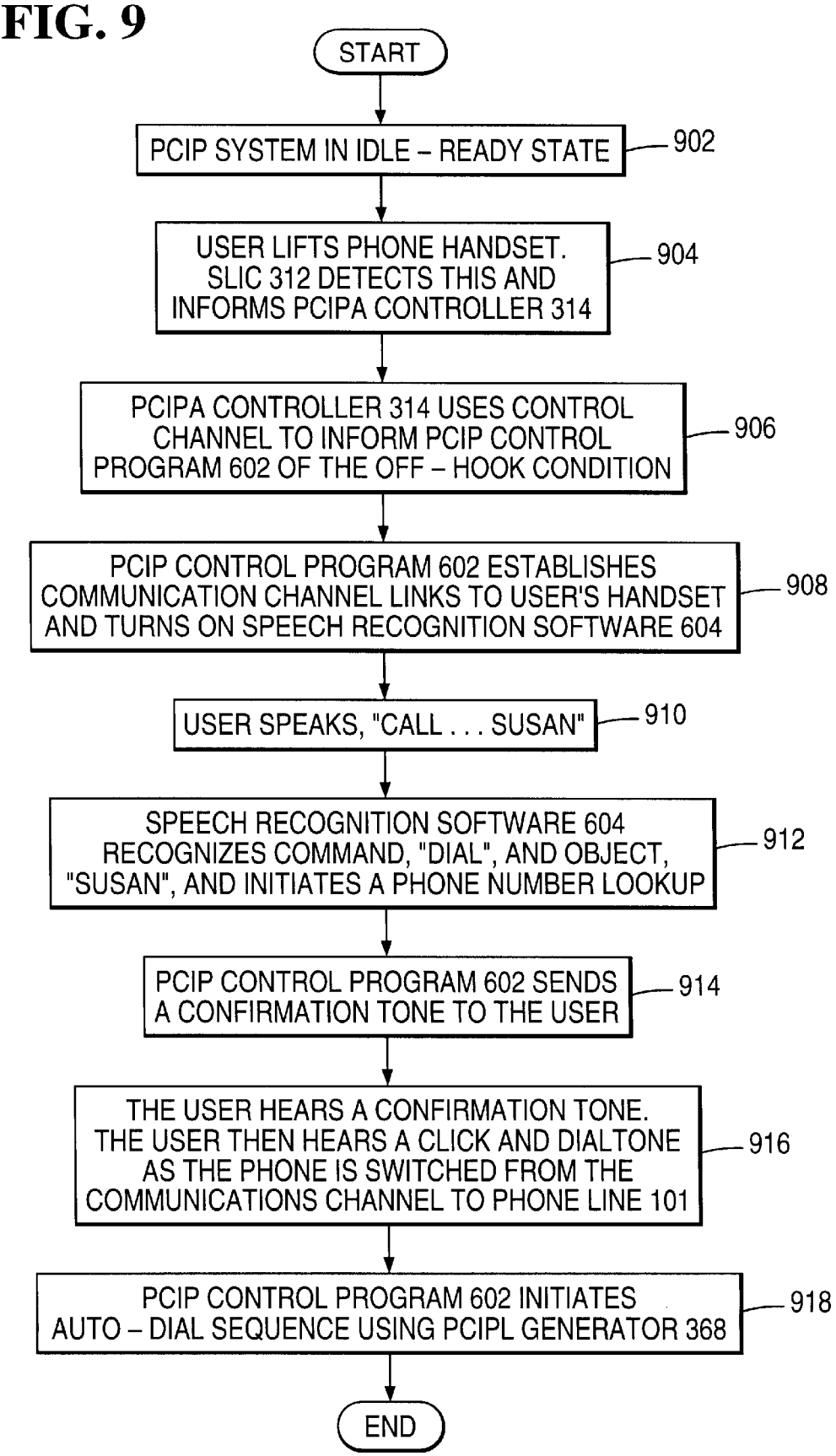
FIG. 9 shows a flowchart illustrating the steps for a user to execute an auto-dial operation of the PCIP system of FIG. 1.

Referring to FIG. 9, there is shown a flowchart illustrating the steps for a user to execute an auto-dial operation, which provides a convenient mechanism of voice initiated, auto-dialing using the PCIP system 100. A simple example is described in accordance with preferred embodiments of the present invention. Other variations should be readily apparent to those skilled in the art in light of the following description. In describing the operation shown in FIG. 9, it is assumed that a user initiates the operation at the telephone set 104A equipped with the adapter 102A. In a preferred embodiment, the auto-dial operation can also be performed from the other telephone sets (104B, . . . , 104N) of the PCIP system 100.

As shown in FIG. 9, in step 902 PCIP system 100 is initially in an IdleReady state, which means: the PC LED 404 on adapter box 202A is ON (lighted), indicating that the PC system 141 is on and connected to the adapter 102A; the PCIPL board 142 is active; the relay 310 on the adapter 102A is switched to the SLIC 312. In this example, it is preferred that the relay 310 is initially connected to the SLIC 312 because the user ideally is able to speak commands to the PC system 131 immediately after picking up the handset of telephone set 104A without speaking over a dialtone sound. By controlling the relay 310 to connect the telephone set 104A to the SLIC 32, the SLIC 312 provides the capability of determining that the handset of telephone set 104A has been lifted and that speech recognition software 604 should be initiated on the communication channel. The user always has the option of over-riding the default setting of the relay 310 by pressing the line button 410 which results in the telephone set 104A being coupled to the telephone line 101 and a normal dialtone condition being presented to the user.

In step 904, the user picks up the handset of telephone set 104A, and uses the panel 329 on the adapter box 202A to verify that the PC LED 404 is ON so that the user knows that he/she can communicate verbally with the PC system 141 for PCIP related features. On the other hand, if the user did not want to use the PCIP related features, the user could press the line button 410 which would cause the line LED 406 to come on and the relay 310 to connect the telephone set 104A to the telephone line 101 so that the user could manually dial a telephone number. At the PCIP adapter circuit level, when the handset is lifted, the SLIC 312 detects an Off-hook state and signals the Off-hood state to the controller 314.

In step 906, the controller 314 forms an information data packet corresponding to the newly generated Off-hook condition. With the embodiment shown in FIG. 3A, the information data packet is sent from the PCIPA controller 314, through: the PCIPA control channel circuitry 318, the PCIPA high frequency interface circuitry 320, the telephone line 101, the PCIPL high frequency interface circuitry 352, the PCIPL control channel circuitry 350, and to the PCIPL controller 346. With the embodiment shown in FIG. 3D, the information data packet is sent from the PCIPA controller 314, through: the PCIPA control channel circuitry 318, the PCIPA wireless transmitter and receiver 396, the PCIPL wireless transmitter and receiver 398, the PCIPL control channel circuitry 350, and to the PCIPL controller 346. The PCIPL controller 346 alerts the PCIP control program 602 on the PC system 141 of the off-hook change of state.

In step 908, after receiving the "handset change of condition" information packet associated with the PCIP adapter 102A, the PCIP control program 602 communicates with all the PCIP adapters (102A, 102B, . . . , 102N) using the control channel to establish a single bidirectional communication channel between the PCIP adapter 102A and the PCIPL board 142. As a result of establishing the bi-directional communication channel between the PCIP adapter 102A and the PCIPL board 142, the other PCIP adapters (e.g. 102B, . . . , 102N) of the PCIP system 100 turn off their respective communication channel transmitters. The PCIP control program 602 invokes speech recognition software 604, which then begins monitoring the communication channel to interpret audio to discern known audio patterns.

In step 910, after picking up the handset of telephone set 104A, the user may immediately speak his/her request into the handset, for example, "Dial . . . Susan". (This example assumes that the prior setup activity happens quickly enough that the user does not need to be prompted). With the embodiment shown in FIG. 3A, this two word audio clip is sent through the SLIC 312, the PCIPA communication channel circuitry 316, the PCIPA high frequency interface circuitry 320, the telephone line 101, the PCIPL high frequency interface circuitry 352, the PCIPL communication channel circuitry 348, the CODEC processor 344, and to the speech recognition software 604 for processing. With the embodiment shown in FIG. 3D, this two word audio clip is sent through the SLIC 312, the PCIPA communication channel circuitry 316, the PCIPA wireless transmitter and receiver 396, the PCIPL wireless transmitter and receiver 398, the PCIPL communication channel circuitry 348, the CODEC processor 344, and to speech recognition software 604 for processing.

Specifically, at the PCIP adapter circuit level, the SLIC 312 converts 2-Wire audio signals from the telephone set 104A of "Dial . . . Susan" to appropriately biased audio signals to send to communication channel circuitry 316. Communication channel circuitry 316 converts analog "Dial . . . Susan" signals to a high frequency modulated signal that is transmitted throughout the home on the communication channel which uses the telephone line 101 or wireless carrier. Communication channel circuitry 348 on the PCIPL board 142 recovers the "Dial . . . Susan" signal and converts the "Dial . . . Susan" signal to analog signals and sends the analog signals to CODEC processor 344. The CODEC processor 344 digitizes the analog audio signals and passes the digitized audio signals (i.e. wavefiles) to the PC system 141 over the PC system bus 196 (or PC Internal Bus) for speech recognition processing.

In step 912, after receiving the wavefile, the speech recognition software 604 on the PC system 141 uses algorithms to recognize speech. In this case, the speech recognition software recognizes the command "Dial" as an auto-dial invocation and recognizes the lookup object "Susan". The speech recognition software does a lookup in Name/Number directory 614 and finds a valid entry.

In step 914, after a successful auto-dial lookup, an acknowledgment tone is sent to the handset of telephone set 104A. To send the acknowledgment tone, the PCIP control program 602 causes CODEC processor 344 on the PCIPL board 142 to generate the distinctive audio tone. With the embodiment shown in FIG. 3A, this tone is sent through the PCIPL communication channel circuitry 348, the PCIPL high frequency interface circuitry 352, the telephone line 101, the PCIPA high frequency interface circuitry 320, the PCIPA communication channel circuitry 316, the SLIC 312, and to the handset of the telephone set 104A. With the embodiment shown in FIG. 3D, this tone is sent through the PCIPL communication channel circuitry 348, the PCIPL wireless transmitter and receiver 398, the PCIPA wireless transmitter and receiver 396, the PCIPA communication channel circuitry 316, the SLIC 312, and to the handset of telephone set 104A.

In step 916, after an acknowledgment tone is transmitted to the user, the PCIP control program 602 sends a command to switch the relay 310 on the PCIP adapter 102A from the SLIC 312 to the telephone line 101. With the embodiment shown in FIG. 3A, this command is sent through: the PCIPL controller 346 (where the command is converted to a network data packet), the PCIPL control channel circuitry 350, the PCIPL high frequency interface circuitry 352, the telephone line 101, the PCIPA high frequency interface circuitry 320, the PCIPA control channel circuitry 318, and to the PCIPA controller 314, where the command is converted to a voltage level that controls the operation of the relay 310. With the embodiment shown in FIG. 3D, this command is sent through: the PCIPL controller 346 (where the command is converted to a network data packet), the PCIPL control channel circuitry 350, the PCIPL wireless transmitter and receiver 398, the PCIPA wireless transmitter and receiver 396, the PCIPA control channel circuitry 318, and to the PCIPA controller 314, where the command is converted to a voltage level that controls the operation of the relay 310.

The user hears a click as the PCIPA relay 310 switches. The user then hears a normal dialtone as the Telephone Company equipment detects the resulting off-hook condition on the telephone line 101.

In step 918, after the dialtone is present on the telephone line 101, the PCIP control program 602 causes the tone generator 368 to output the correct tone sequence corresponding to Susan's telephone number onto telephone line 101. The user also hears this tone sequence, and thereafter, the call proceeds in a normal manner as if the user manually dialed the call.

Auto Dial Programming of the PCIP System

Figure 10:
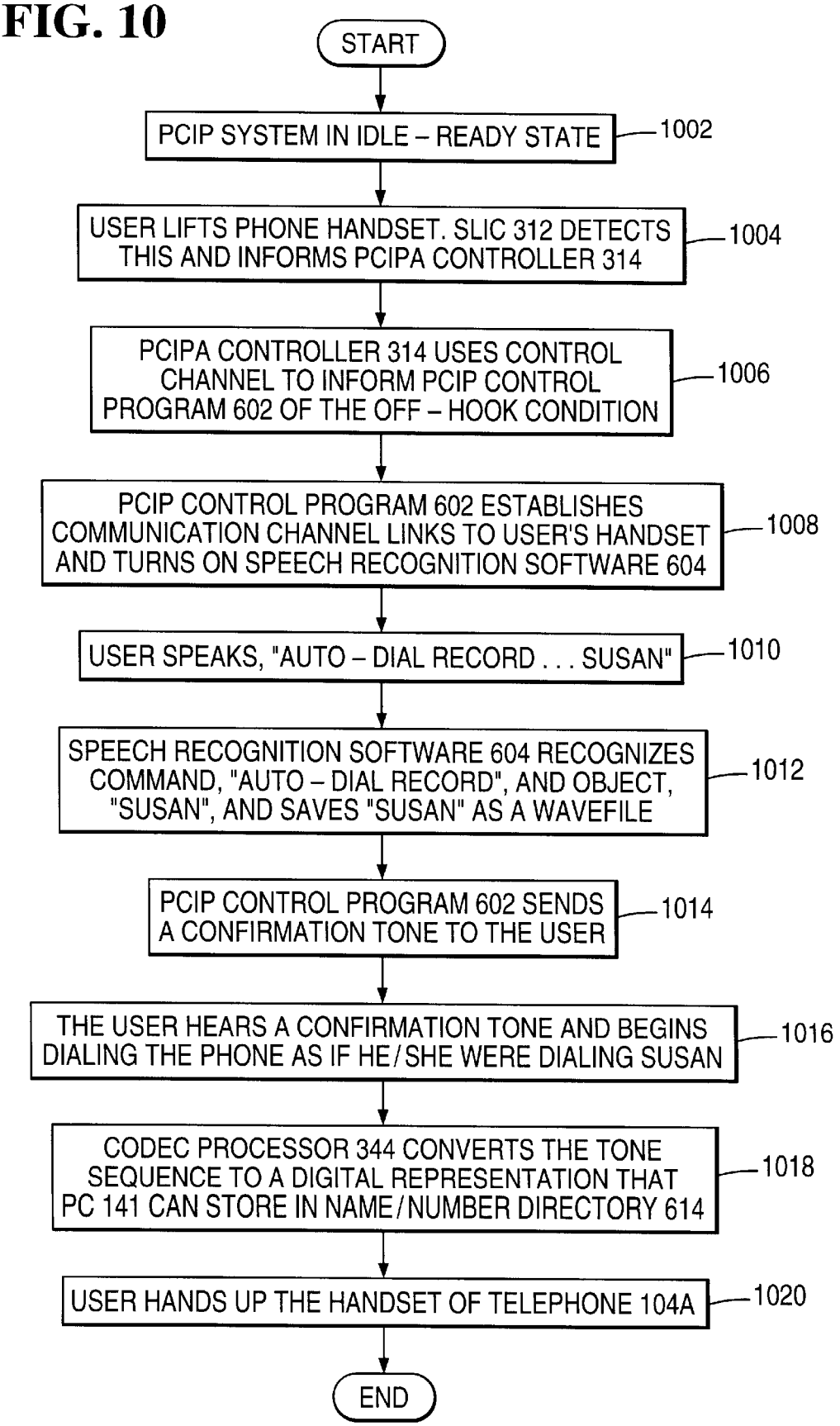
FIG. 10 shows a flowchart illustrating the steps for a user to execute an auto-dial programming operation of the PCIP system of FIG. 1.

Referring to FIG. 10, there is shown a flowchart illustrating the steps for a user to execute an auto-dial programming operation, which provides a convenient mechanism to add new entries into the Name/Number directory 614 of the PCIP system 100. A simple example is described in accordance with preferred embodiments of the present invention. Other variations should be readily apparent to those skilled in the art in light of the following description. In describing the operation shown in FIG. 10, it is assumed that a user initiates the operation at the telephone set 104A equipped with the adapter 102A. In a preferred embodiment of the present invention, the other telephone sets (104B, ..., 104N) may also be used to perform the auto-dial record operation.

As shown in FIG. 10, in step 1002, the PCIP system 100 is initially in Idle-Ready State, which means: the PC LED 404 on the adapter box 202A is ON (lighted) indicating that the PC system 141 is on and connected to the adapter 102A; the PCIPL board 142 is active; the relay 310 of the adapter 102A is switched to the SLIC 312. In this example. it is preferred that the relay 310 is initially connected to the SLIC 312 because the user ideally should be able to speak commands to the PC system 141 immediately after picking up the handset of telephone set 104A without speaking over a dialtone sound. By initially actuating the relay 310 so that the telephone set 104A is connected to the SLIC 312, the SLIC 312 may provide the capability of determining that the handset of telephone set 104A has been lifted and that speech recognition software 604 should be initiated on the communication channel. The user always has the option of over-riding the default setting of the relay 310 by pressing line button 410 which will result in the relay 312 connecting the telephone set 104A to the telephone line 101 and a normal dialtone condition being presented to the user.

In step 1004, the user picks up the handset of the telephone set 104A, and uses the panel 329 on the adapter box 202A to verify that the PC LED 404 is ON so that the user knows that he/she can communicate verbally with the PC system 141 for PCIP related features. On the other hand, if the user did not want to use the PCIP related features, the user could press line button 410 which would cause the line LED 406 to come on, and the telephone set 104A to be connected to the telephone line 101 so that the user may dial a telephone number manually. At the PCIP adapter circuit level, when the handset is lifted, the SLIC 312 detects an Off-hook state and signals the Off-hook state to the controller 314.

In step 1006, the controller 314 forms an information data packet corresponding to the newly generated Off-hook condition. With the embodiment shown in FIG. 3A, the information data packet is sent from the PCIPA controller 314 through the PCIPA control channel circuitry 318, the PCIPA high frequency interface circuitry 320, the telephone line 101, the PCIPL high frequency interface circuitry 352, the PCIPL control channel circuitry 350, and to the PCIPL controller 346. With the embodiment shown in FIG. 3D, the information data packet is sent from the PCIPA controller 314 through the PCIPA control channel circuitry 318, the PCIPA wireless transmitter and receiver 396, the PCIPL wireless transmitter and receiver 398, the PCIPL control channel circuitry 350, and to the PCIPL controller 346. The PCIPL controller 346 alerts the PCIP control program 602 on the PC system 141 of the off-hook change of state.

In step 1008, after receiving the "handset change of condition" information packet associated with the PCIP adapter 102A, the PCIP control program 602 communicates with all the PCIP adapters (102A, 102B, ..., 102N) using the control channel, to establish a single bidirectional communication channel between the PCIP adapter 102A and the PCIPL board 142. As a result of establishing the bidirectional communication channel between the PCIP adapter 102A and the PCIPL board 142, the other PCIP adapters (e.g. 102B, ..., 102N) of the PCIP system 100 turn off their respective communication channel transmitters. The PCIP control program invokes speech recognition software 604, which then begins monitoring the communication channel to interpret audio signals to discern known audio patterns. In step 1010, after picking up the handset of telephone set 104A, the user may immediately speak his/her request into the handset, for example, "auto-dial record ... Susan". (This example assumes that the prior setup activity happens quickly enough that the user does not need to be prompted). With the embodiment shown in FIG. 3A, this three word audio clip is sent through the SLIC 312, the PCIPA communication channel circuitry 316, the PCIPA high frequency circuitry 320, the telephone line 101, the PCIPL high frequency interface circuitry 352, the PCIPL communication channel circuitry 348, the CODEC processor 344, and to the speech recognition software 604 for processing. With the embodiment shown in FIG. 3D, this three word audio clip is sent through the SLIC 312, the PCIPA communication channel circuitry 316, the PCIPA wireless transmitter and receiver 396, the PCIPL wireless transmitter and receiver 398, the PCIPL communication channel circuitry 348, the CODEC processor 344, and to the speech recognition software 604 for processing.

Specifically, at the PCIP adapter circuit level, the SLIC 312 converts 2-Wire audio signals from telephone set 104A of "auto-dial record ... Susan" to appropriately biased audio signals to send to the communication channel circuitry 316. The communication channel circuitry 316 converts the analog "auto-dial record ... Susan" signal to a high frequency modulated signal that is transmitted throughout the home on the communication channel which uses the telephone line 101 or wireless carrier.

The communication channel circuitry 348 on the PCIPL board 142 recovers the "auto-dial record ... Susan" signal and converts the "auto-dial record ... Susan" signal to an analog audio signal and sends the analog audio signal to the CODEC processor 344. The CODEC processor 344 digitizes the analog audio signal to obtain a wavefile and passes the wavefile to the PC system 141 over the PC system bus 196 (or PC Internal Bus) for speech recognition processing.

In step 1012, after receiving the wavefile, the speech recognition software 604 on the PC system 141 uses algorithms to recognize speech. In this case, the speech recognition software recognizes the command "auto-dial record" as a feature invocation and recognizes "Susan" as an object to be saved as a wavefile in the SR Vocabulary database 612. The PCIP control program 602 makes a corresponding entry in the Name/Number directory 614 and waits for the user to provide the telephone number to complete this entry.

In step 1014, an acknowledgment tone is sent to the handset of telephone set 104A to prompt the user to input Susan's telephone number. To send the acknowledgment tone, the PCIP control program 602 causes CODEC processor 344 on PCIPL board 142 to generate the distinctive audio tone. With the embodiment shown in FIG. 3A, this tone is sent through the PCIPL communication channel circuitry 348, the PCIPL high frequency interface circuitry 352, the telephone line 101, the PCIPA high frequency interface circuitry 320, the PCIPA communication channel circuitry 316, the SLIC 312, and to the handset of the telephone set 104A. With the embodiment shown in FIG. 3D, this tone is sent through the PCIPL communication channel circuitry 348, the PCIPL wireless transmitter and receiver 398, the PCIPA wireless transmitter and receiver 396, PCIPA communication channel circuitry 316, SLIC 312, and to the handset of telephone set 104A.

In step 1016, after an acknowledgment tone is transmitted to the user, the user begins dialing the touch-tone phone as if he/she were dialing Susan. With the embodiment shown in FIG. 3A, the audio tones created by the touch-tone phone are transmitted through: the SLIC 312, the PCIPA communication channel circuitry 316, the PCIPA high frequency interface circuitry 320, the telephone line 101, the PCIPL high frequency circuitry 352, the PCIPL communication channel circuitry 348, and to the CODEC processor 344. With the embodiment shown in FIG. 3D, the audio tones created by the touch-tone phone are transmitted through: the SLIC 312, the PCIPA communication channel circuitry 316, the PCIPA wireless transmitter and receiver 396, the PCIPL wireless transmitter and receiver 398, the PCIPL communication channel circuitry 348, and to the CODEC processor 344.

In step 1018, the CODEC processor 344 converts the tone sequence to a digital representation that the PC can store in the corresponding entry in the Name/Number directory 614.

In step 1020, the operation is completed when the user replaces the handset of the telephone set 104A, the SLIC 312 detects and reports the on-hook condition similar to how the SLIC 312 reported the off-hook condition. The PCIP system 100 then returns to Idle-Ready state.

Basic Intercom Operation of the PCIP System

Figure 11:
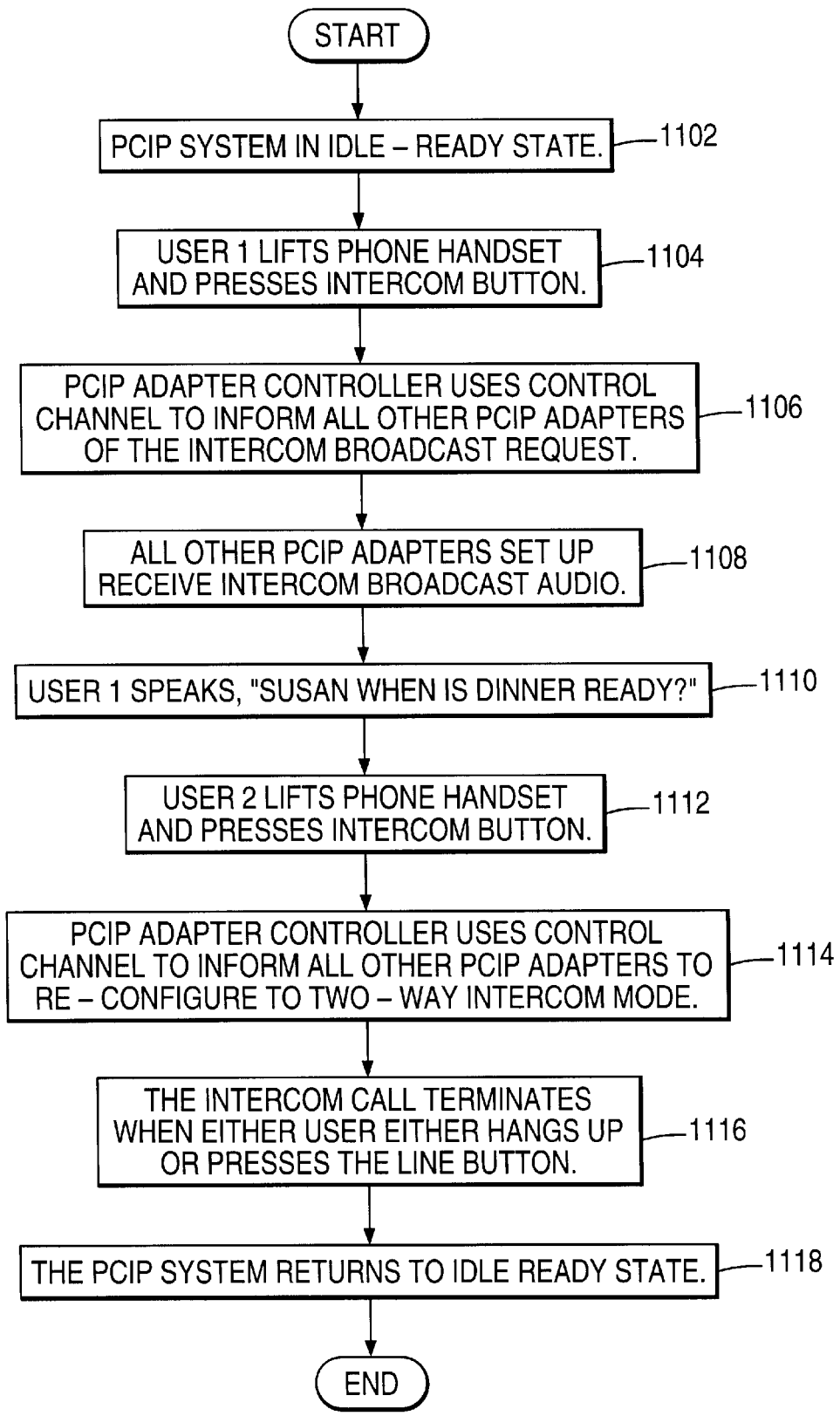
FIG. 11 shows a flowchart illustrating the steps for a user to execute a basic intercom operation of the PCIP system of FIG. 1.

Referring to FIG. 11, there is shown a flowchart illustrating a basic intercom operation of the PCIP system 100. A simple example is described in accordance with a preferred embodiment of the present invention. Other variations should be readily apparent to those skilled in the art in light of the following description. In describing the operation shown in FIG. 11, it is assumed that a user initiates the intercom operation at the telephone set 104A equipped with the adapter 102A. In a preferred embodiment of the present invention, the other telephone sets (104B, . . . , 104N) of the PCIP system 100 may also be used to initiate the intercom operation.

As shown in FIG. 11, in step 1102, the PCIP system 100 is initially in Idle-Ready State, which means: the PC LED 404 on the adapter box 202A is ON (lighted) indicating that the PC system 141 is on and connected to the adapter 102A; the PCIPL board 142 is active; the relay 310 of the adapter 102A is switched to the SLIC 312. In this example. it is preferred that the relay 310 is initially connected to the SLIC 312 because the user ideally should be able to speak commands to the PC system 141 immediately after picking up the handset of telephone set 104A without speaking over a dialtone sound. By initially actuating the relay 310 so that the telephone set 104A is connected to the SLIC 312, the SLIC 312 may provide the capability of determining that the handset of telephone set 104A has been lifted and that speech recognition software 604 should be initiated on the communication channel. The user always has the option of over-riding the default setting of the relay 310 by pressing line button 410 which will result in the relay 312 connecting the telephone set 104A to the telephone line 101 and a normal dialtone condition being presented to the user.

In step 1104, to initiate an intercom call, a user1 lifts the handset of telephone set 104A and activates intercom button 408. In response to the activation of intercom button 408, human interface circuitry 309 generates an intercom broadcast request and passes it to controller 314. By looking at the panel 329 on the adapter box 202A, the user1 can verify that the Intercom LED 404 is ON, so that the user1 knows that he/she can communicate via a broadcast mode of the PCIP system 100. At the PCIP adapter circuit level, when the handset is lifted, the SLIC 312 detects Off-hook state and signals this state to PCIPA controller 314. The PCIPA controller 314 detects the button press via the human interface circuitry 309. The PCIPA controller 314 causes the PC LED 404 to turn off and the Intercom LED 412 to turn on.

In step 1106, the PCIPA controller 314 forms an information data packet corresponding to the newly generated "intercom broadcast request" condition which informs all other PCIP adapters ( ) that the PCIP adapter 102A will be transmitting audio from the user1 speaking into the handset onto one of the two high frequency communication channels and that all of the other PCIP adapter boxes (202B, . . . , 202N) must receive on the same communication channel and route the audio to their respective speaker 306. With the embodiment shown in FIG. 3A, the intercom broadcast request packet is sent from the PCIPA controller 314 of the PCIP adapter 102A, through the control channel circuitry 318, and the high frequency interface circuitry 320 of the PCIP adapter 102A. Furthermore, the intercom broadcast request packet is sent through the telephone line 101 to the high frequency interface circuitry 320, the control channel circuitry 318, and the controller 314 of the other PCIP adapters 102B, . . . , 102N.

With the embodiment shown in FIG. 3B, the intercom broadcast request packet is sent from the PCIPA controller 314 of the PCIP adapter 102A, through the control channel circuitry 318, and the wireless transmitter and receiver 396 of the PCIP adapter 102A. Moreover, the intercom broadcast request packet is sent the wireless transmitter and receiver 396, the control channel circuitry 318, and the PCIPA controller 314 of each of the other PCIP adapters 102B, . . . , 102N. In this way, the PCIP controller in adapter 102A alerts PCIP control programs 602s on the other adapters (102B, . . . , 102N) of the off-hook change of state.

In step 1108, after receiving the "intercom broadcast request" information packet from PCIP adapter 102A, all the other PCIP adapters (102B, . . . , 102N) set their communication channel circuits to receive audio signals on the assigned frequency and route received audio signals to their respective speakers 308.

In step 1110, after picking up the handset of telephone set 104A, the user1 speaks into the telephone handset to request that the intended person to come to the nearest phone, for example: "Susan when is dinner?" This can be heard by anyone near one of the PCIP adapters (102B, . . . , 102N) in the system. (This example assumes that the prior setup activity happens quickly enough that the user1 does not need to be prompted). With the embodiment shown in FIG. 3A, this audio signal is sent through the SLIC 312, the communication channel circuitry 316, and the high frequency circuitry 320 of the PCIP adapter 102A. Moreover, this audio signal is sent through the telephone line 101 to the high frequency interface circuitry 320, the communication channel circuitry 316, and the speakers 308 of the other PCIP adapters 102B, . . . , 102N.

With the embodiment shown in FIG. 3B, this audio signal is sent through the SLIC 312, the communication channel circuitry 316, and the wireless transmitter and receiver 396 of the PCIP adapter 102A. Moreover, this audio signal is through the wireless transmitter and receivers 396, the communication channel circuitry 316, and the speakers 308 of the other PCIP adapters 102B, . . . or 102N.

Specifically, at the PCIP adapter circuit level, the SLIC 312 of the PCIP adapter 102A converts 2-wire audio signals from the telephone set 104A of "Susan when is dinner?" to appropriately biased analog audio signals to send to communication channel circuitry 316. The communication channel circuitry 316 converts the analog "Susan when is dinner?" signal to a high frequency modulated audio signal that is transmitted throughout the home on the communication channel which uses the telephone line 101 or wireless carrier.

At step 1110, the communication channel circuitry 316 of PCIP adapter 102A is not interactively connected to the communication circuitry on the other PCIP adapters 102B, . . . , 102N, meaning that there is no bi-directional signal flow between PCIP adapter 102A and any one of the other PCIP adapters 102B, or 102N. Consequently, the telephone set 104A is not interactively connected to the other telephone sets 104B, . . . , 104N, meaning that there is no bidirectional signal flow between the telephone set 104A and any one of the other telephone sets (104B, . . . , or 104N).

In step 1112, a user2 decides to answer the intercom call. The user2 goes to nearest telephone set, in this case, telephone set 104B, and picks up the handset and activates the Intercom button 414 on PCIP adapter box 202B. In response to the activation of the Intercom button 414, the human interface circuitry 309 of the adapter 102B signals to the controller 314 that the Intercom button 414 has been activated. The controller 414, in response to the activation signals, causes the Intercom LED 412 to turn ON and the PC LED to turn off. The user2 looks at panel 329 on adapter box 202B to verify that the Intercom LED is ON, and thus determines that he/she can communicate via the two way mode of the intercom feature. At the circuit level of the PCIP adapter 102B, when the handset is lifted, the SLIC 312 detects an Off-hook state and signals the Off-hook state to the controller 314. The controller 314 of the PCIP adapter 102B detects the button activation via the interface circuitry 309 and the off-hook change of state.

In step 1114, the controller 314 of PCIP adapter 102B detects the off-hook and the button activation and forms an information data packet corresponding to the newly generated "two way intercom request" condition. The two way intercom request packet is transmitted over the control channel to all other PCIP adapters, informing all other PCIP adapters that PCIP adapter 102A and PCIP adapter 102B will be engaged in two way intercom and that all of the other PCIP adapter boxes must not use the communication channels. In response, the other PCIP adapter boxes 102C, . . . , 102N actuate their respective relays 310 so that the telephone sets 104C, . . . , 104N are connected to the telephone line 101 and cause the Line LED 406 to come on.

The PCIP adapter 102A and PCIP adapter 102B act together to form a single bi-directional communication channel, which will not interfere with regular communication on the telephone line 101. The call proceeds with one user transmitting on the lower frequency and one user transmitting on the higher frequency. The user2 may respond, "Get your own dinner", and so forth. Others cannot participate in the intercom call in progress. If a third user picks up another telephone and presses the Intercom button 414, the Intercom LED 412 does not light (or blinks) and the phone remains connected to the telephone line 101. The blinking state of the Intercom LED 412 on all the PCIP adapter boxes signifies that an Intercom call is in progress. Control messages are transmitted in a manner consistent with that described in step 1106. Audio from the telephone set is biased at the SLIC, modulated, routed, and demodulated in a manner consistent with that described in step 1110.

At step 1114, the communication channel between adapters 102A and 102B uses two carrier frequencies to allow simultaneous voice transmission in both directions between adapters 102A and 102B, meaning that there is a bi-directional signal flow between adapters 102A and 102B. Consequently, the telephone set 104A is interactively connected to the telephone set 104B, meaning that there is a bi-directional signal flow between the telephone set 104A the telephone set 104B.

In step 1116, the intercom call terminates when either of the users hangs up or presses the PC button 408 or the Line button 410 on the adapter box (202A or 202B). This is detected by the SLIC 312 or the controller 314 via human interface circuitry 309 of the PCIP adapters 102A or 102B. This change of state is communicated to all other PCIP adapters via an information packet transmitted over the control channel.

In step 1118, the PCIP system 100 returns to Idle-Ready state.

At any time during the intercom call, normal incoming and outgoing telephone calls can proceed to and from any PCIP adapter equipped phones that have their Line LED 406 ON. Simultaneous phone calls and intercom calls will not interfere with each other.

Voice Addressed Intercom Operation of the PCIP System

Figure 12:
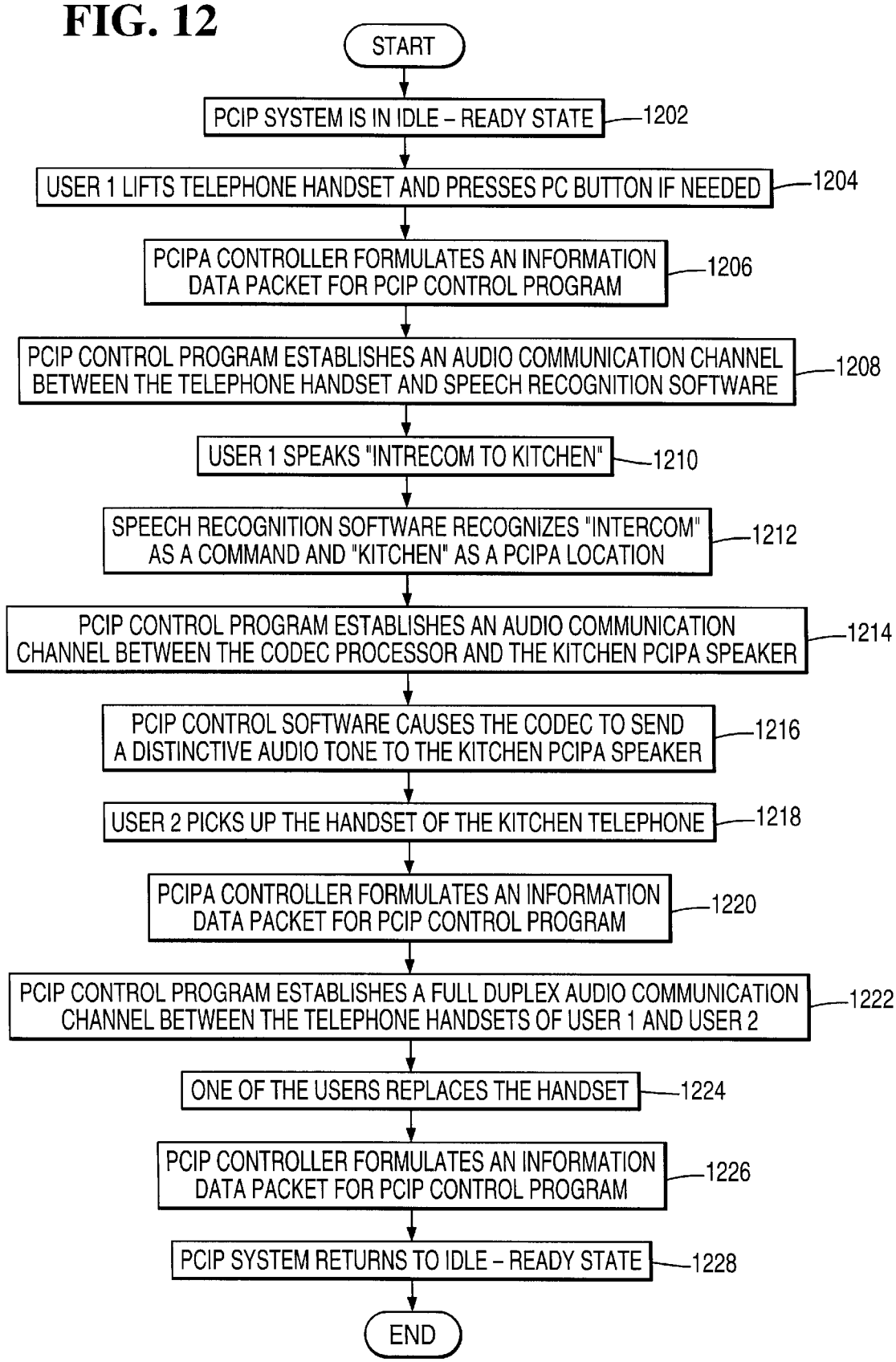
FIG. 12 shows a flowchart illustrating the steps for a user to execute an voice addressed intercom operation of the PCIP system of FIG. 1.

Referring to FIG. 12, there is shown a flowchart illustrating the steps for a user to execute an intercom operation, which provides a convenient mechanism of voice initiated intercom using the PCIP system 100. In describing the operation shown in FIG. 12, it is assumed that user1 initiates the intercom at telephone set 104A equipped with the adapter 102A. In a preferred embodiment, the other telephone sets (104B$_1$, . . . , 104N) may also be used to perform the intercom operation.

As shown in FIG. 12, in step 1202, the PCIP system 100 is initially in an Idle-Ready state, which means: the PC LED 404 on the adapter box 202A is ON (lighted, indicating that the PC system 141 is on and connected to the adapter 102A; the PCIPL board 142 is active; the relay 310 on the adapter 102A is switched to the SLIC 312. In this example, it is preferred that the relay 310 is initially connected to the SLIC 312 because the user should be able to speak commands to the PCIP system 100 immediately after picking up the handset of telephone set 104A without speaking over a dialtone sound. with the relay 310 connecting the telephone set 104A to the SLIC 312, the SLIC 312 may determine that the handset of telephone set 104A has been lifted and that the speech recognition software 604 should be initiated on the communication channel. The user always has the option of over-riding the default setting of the relay 310 by pressing the line button 410, which will result in a normal dialtone condition.

In step 1204, the user1 picks up the handset of the telephone set 104A, and uses the panel 329 on the adapter box 202A to verify that the PC LED 404 is ON so that the user knows the he/she can communicate verbally with the PC system 141 for the intercom feature. (On the other hand, if the user did not want to use the PCIP related features he/she would press the line button 406, to connect the telephone set 104A to the telephone line 101.) At the PCIP adapter circuit level, when the handset is lifted, the SLIC 312 detects an Off-hook state and signals the Off-hook state to the controller 314 of the PCIP adapter 102A.

In step 1206, the controller 314 formulates an information data packet to be sent to the PCIP control program 602, corresponding to this newly generated Off-hook condition. With the embodiment shown in FIG. 3A, this packet is sent from the PCIPA controller 314, through the PCIPA control channel circuitry 318, the PCIPA high frequency interface circuitry 320, the telephone line 101, the PCIPL high frequency interface circuitry 352, the PCIPL control channel circuitry 350, and to the PCIPL controller 346. With the embodiment shown in FIG. 3D, this packet is sent from the PCIPA controller 314 through: the PCIPA control channel circuitry 318, the PCIPA wireless transmitter and receiver 396, the PCIPL wireless transmitter and receiver 398, the PCIPL control channel circuitry 350, and to the PCIPL controller 346. The PCIPL controller 346 alerts the PCIP control program 602 on the PC system 141 of the off-hook change of state.

In step 1208, after receiving the "handset change of condition" information packet associated with the PCIP adapter 102A, the PCIP control program 602 communicates with all the PCIP adapters (102A, 102B, . . . , 102N) using the control channel in order to establish an audio communication channel between the handset of telephone set 104A and speech recognition software 604. Other PCIP adapters, e.g. 102B, . . . , 102N, in the system must have their communication channel transmitters turned off. The PCIP control program 602 invokes speech recognition software 604, which then begins monitoring the audio communication channel to interpret audio to discern known audio patterns.

In step 1210, after picking up the handset of telephone set 104A, user1 may immediately speak his/her request into the handset, "Intercom kitchen". (This example assumes that the prior setup activity happens quickly enough that the user does not need to be prompted). with the embodiment shown in FIG. 3A, this two word audio clip is sent through: the SLIC 312, the PCIPA communication channel circuitry 316, the PCIPA high frequency interface circuitry 320, the telephone line 101, the PCIPL high frequency interface circuitry 352, the PCIPL communication channel circuitry 348, the CODEC 344, and to the speech recognition software 604 for processing. With the embodiment shown in FIG. 3D, this two word audio clip is sent through: the SLIC 312, the PCIPA communication channel circuitry 316, the PCIPA wireless transmitter and receiver 396, the PCIPL wireless transmitter and receiver 398, the PCIPL communication channel circuitry 348, the CODEC 344, and to the speech recognition software 604 for processing.

Specifically, at the PCIP adapter circuit level, the SLIC 312 converts 2-Wire audio from the telephone set 104A of "Intercom kitchen" to appropriately biased audio signals to send to the PCIPA communication channel circuitry 316. The PCIPA communication channel circuitry 316 converts the analog "Intercom kitchen" signal to a high frequency modulated signal that is transmitted throughout the home on the communication channel which uses the telephone line 101 or wireless carrier.

Communication channel circuitry 348 on the PCIPL board 142 recovers "Intercom kitchen" and sends the analog audio signal to the CODEC 344. The CODEC 344 digitizes the analog audio signal and passes the digitizes audio signal (i.e. wavefile) to the PC system 141 over the PC system bus 196 (or PC Internal Bus) for speech recognition processing.

The ID information of the PCIP adapter 102A is also sent to the PC system 141 through the PCIPL controller 346 via the control channel between the PCIP adapter 102A and the PCIPL board 142.

In step 1212, after receiving the wavefile, the speech recognition software 604 on the PC system 141 uses algorithms to recognize the speech. In this case, the speech recognition software recognizes the command "Intercom" as a command and recognizes the lookup object kitchen as a PCIPA location. The speech recognition software does a lookup in the PCIPA location directory 616 based on the ID information of PCIP adapter 102A, and finds a valid entry, which contains the location information for the PCIP adapter located in the kitchen.

In step 1214, after a successful intercom location lookup, the PCIP control program 602 establishes an audio communication channel between the CODEC 344 and the PCIPA speaker in the kitchen. In this example, it is assumed that the PCIP adapter 102B is located in the kitchen.

In step 1216, the PCIP control program 602 causes the CODEC 344 on the PCIPL board 142 to generate a distinctive audio tone, which allows a user to distinguish an intercom call from a telephone call. With the embodiment shown in FIG. 3A, this tone is sent through: the PCIPL communication channel circuitry 348, the PCIPL high frequency interface circuitry 352, and the telephone line 101. Moreover, this tone is sent through the high frequency interface circuitry 320, the communication channel circuitry 316, and to the speaker 308 of the PCIP adapter 102B. With the embodiment shown in FIG. 3D, this tone is sent through: the PCIPL communication channel circuitry 348, and the PCIPL wireless transmitter and receiver 398. Moreover, this tone is sent through the wireless transmitter and receiver 396, the communication channel circuitry 316, and to the speaker 308 of the PCIP adapter 102B.

In step 1218, user2 picks up the telephone handset of the kitchen telephone (104B).

In step 1220, the controller 314 of PCIP adapter 102B forms an information data packet to be sent to the PCIP control program 602, corresponding to this newly generated Off-hook condition. With the embodiment shown in FIG. 3A, this packet is sent from the controller 314 of the PCIP adapter 102B through: the control channel circuitry 318, and the high frequency interface circuitry 320 of the PCIP adapter 102B. Moreover, this packet is sent through the telephone line 101, the PCIPL high frequency interface circuitry 352, and the PCIPL control channel circuitry 350, and to the PCIPL controller 346. With the embodiment shown in FIG. 3D, this packet is sent from the controller 314 through the control channel circuitry 318, and the wireless transmitter and receiver 396 of the PCIP adapter 102B. Moreover, this packet is sent through the PCIPL wireless transmitter and receiver 398, the PCIPL control channel circuitry 350, and to the PCIPL controller 346. The PCIPL controller 346 alerts the PCIP control program 602 on the PC system 141 of the off-hook change of state.

In step 1222, the PCIP control program 602 sends a command to establish a full duplex audio communication channel between the telephone handsets of user1 and user2, where the higher communication channel frequency will carry audio from user1 to user2 and the lower communication channel frequency will carry audio from user2 to user1. To coordinate the various PCIP adapters such that they transmit and receive on the correct frequencies, the PCIP control program sends out appropriate commands. With the embodiment shown in FIG. 3A, each command is sent through: the PCIPL controller 346 (where the command is converted to a network data packet), the PCIPL control channel circuitry 350, the PCIPL high frequency interface circuitry 352, the telephone line 101. The command is also sent through the high frequency interface circuitry 320, the control channel circuitry 318, and to the controller 314 of PCIP adapter 102A or 102B, where the command is used to enable and/or switch the transmit and receive frequencies of the communication channels. With the embodiment shown in FIG. 3D, this command is sent through: the PCIPL controller 346 (where the command is converted to a network data packet), the PCIPL control channel circuitry 350, and the PCIPL wireless transmitter and receiver 398. Moreover, the command is sent through the wireless transmitter and receiver 396, the control channel circuitry 318, and to the controller 314 of the PCIP adapters 102A or 102B, where the command is used to enable and/or switch the transmit and receive frequencies of the communication channels.

After step 1222 has established the full duplex audio communication channel, user1 and user2 can intercom with each other.

In step 1224, one of the two users replaced his/her handset. In this example, it is assumed that user1 replaces the handset of telephone set 104A.

In step 1226, the PCIPA(102A) controller 314 formulates an information data packet to be sent to the PCIP control program 602 corresponding to this newly generated Off-hook condition. This information data packet is sent to the PCIP control program 602 via the control channel, as described in step 1206.

In step 1228, the PCIP control program 602 sets the PCIP system 100 to the Idle-Ready state, in response to the information data packet formulated in step 1226.

Voice Broadcast Intercom Operation of the PCIP System

Figure 13:
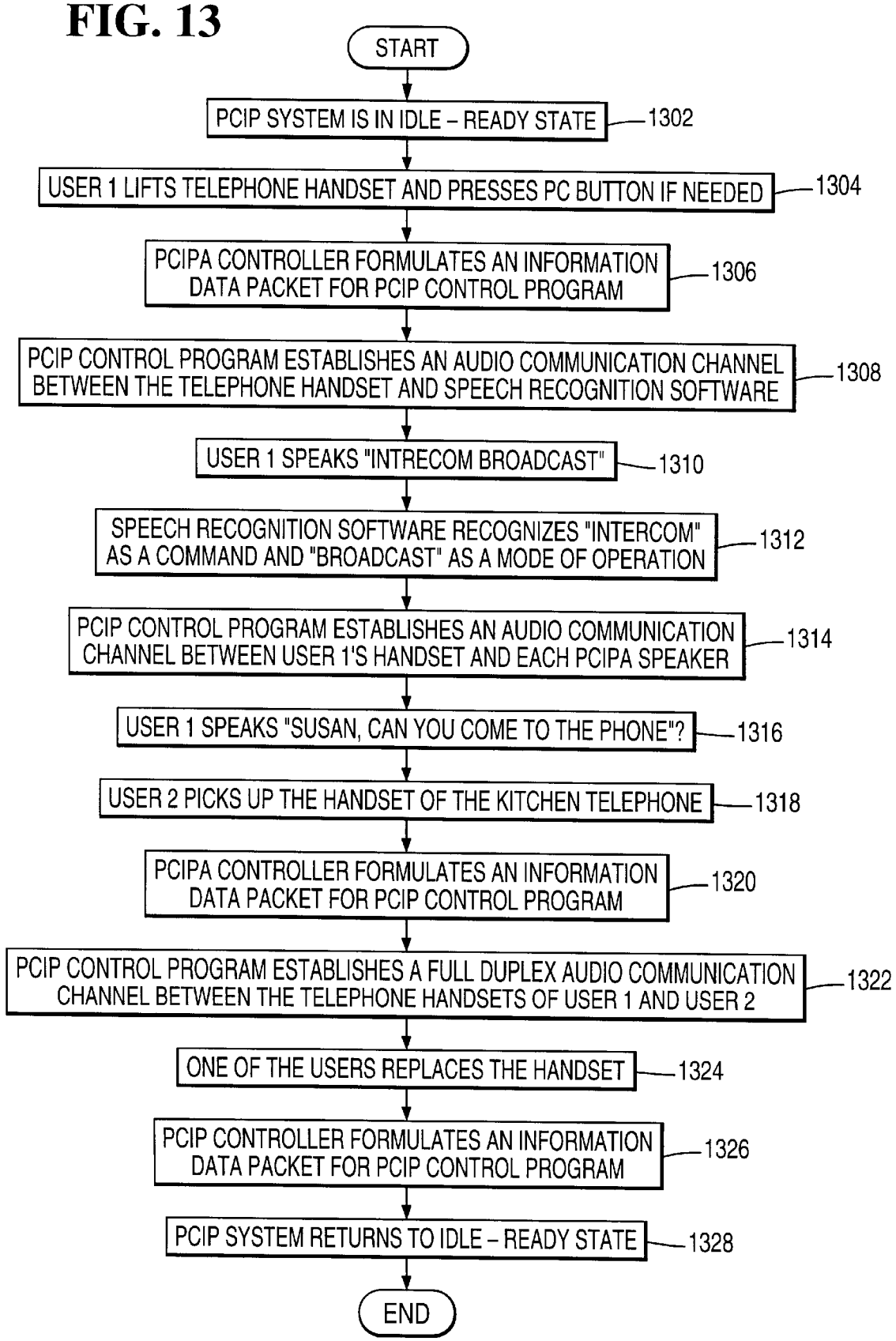
FIG. 13 shows a flowchart illustrating the steps for a user to execute a voice broadcast intercom operation of the PCIP system of FIG. 1.

Referring to FIG. 13, there is shown a flowchart illustrating the steps for a user to initiate an intercom session by using a verbal announcement that can be heard at the speaker of each PCIP adapter box 202A, 202B, . . . , 202N, rather than ringing an individual phone as was described in FIG. 12. The ringing mode of operation would be particularly suitable in a situation where it is desired to not disturb others (for example, a small office), whereas the broadcast mode of operation would be more suitable in a situation where location of the called party was not know. Both modes of operation are readily available on command. One simple example is provided here to describe one embodiment of the present invention, other variations should be readily apparent to those skilled in the art. In describing the operation shown in FIG. 7, it is assumed that user1 initiates the intercom at the telephone set 104A equipped with the adapter 102A. In a preferred embodiment, the other telephone sets (104B, . . . , 104N) may also be used to perform the intercom operation.

As shown in FIG. 13, in step 1302, the PCIP system 100 is initially in an Idle-Ready state, which means that: the PC LED 404 on the adapter box 202A is ON (lighted, indicating that the PC system 141 is on and connected to the adapter 102A; the PCIPL board 142 is active; the relay 310 on the adapter 102A is switched to the SLIC 312. In this example, it is preferred that the relay 310 is initially connected to the SLIC 312 because the user should be able to speak commands to the PC immediately after picking up the handset of the telephone set 104A without speaking over a dialtone sound. With the relay 310 connecting the telephone set 104A to the SLIC 312, the SLIC 312 may provide the capability of determining that the handset of telephone set 104A has been lifted and that the speech recognition software 604 should be initiated on the communication channel. The user always has the option of over-riding the default setting of the relay 310 by pressing the line button 410, which will result in a normal dialtone condition.

In step 1304, the user1 picks up the handset of the telephone set 104A, and uses the panel 329 on the adapter box 202A to verify that the PC LED 404 is ON so that the user knows that he/she can communicate verbally with the PC system 141 for intercom feature. (On the other hand, if the user did not want to use the PCIP related features, he/she would press the line button 410, to connect the telephone set 104A to the telephone line 101). At the PCIP adapter circuit level, when the handset is lifted, the SLIC 312 detects the Off-hook state and signals this state to the controller 314 of the PCIP adapter 102A.

In step 1306, the controller 314 of the PCIP adapter 102A formulates an information data packet to be sent to the PCIP control program 602, corresponding to this newly generated Off-hook condition. With the embodiment shown in FIG. 3A, this packet is sent from the controller 314 through the control channel circuitry 318, and the high frequency interface circuitry 320 of the PCIP adapter 102A. The packet is also sent through the telephone line 101, the PCIPL high frequency interface circuitry 352, the PCIPL control channel circuitry 350, and to the PCIPL controller 346. With the embodiment shown in FIG. 3D, this packet is sent from the controller 314 through the control channel circuitry 318, and the wireless transmitter and receiver 396 of the PCIP adapter 102A. Moreover, the packets is sent through the PCIPL wireless transmitter and receiver 398, the PCIPL control channel circuitry 350, and to the PCIPL controller 346. The PCIPL controller alerts the PCIP control program 602 on the PC system 141 of the off-hook change of state.

In step 1308, after receiving the "handset change of condition" information packet associated with the PCIP adapter 102A, the PCIP control program 602 communicates with all the PCIP adapters (102A, 102B, . . . , 102N) using the control channel in order to establish an audio communication channel between the handset of telephone set 104A and the speech recognition software 604. The other PCIP adapters, e.g. 102B, . . . , 102N, as a result of the above communication turn their respective communication channel transmitters off. The PCIP control program 602 invokes the speech recognition software 604, which then begins monitoring the audio communication channel to discern known audio patterns from the audio signals.

Instep 1310, after picking up the handset of the telephone set 104A, user1 may immediately speak his/her request into the handset, "Intercom broadcast". (This example assumes that the prior setup activity happens quickly enough that the user does not need to be prompted). With the embodiment shown in FIG. 3A, this two word audio clip is sent through: the SLIC 312, the communication channel circuitry 316, and the high frequency interface circuitry 320 of the adapter 102A. The two word audio clip is also sent through the telephone line 101, the PCIPL high frequency interface circuitry 352, the PCIPL communication channel circuitry 348, the CODEC 344, and to the speech recognition software 604 for processing. With the embodiment shown in FIG. 3D, this two word audio clip is sent through: the SLIC 312, the communication channel circuitry 316, and the wireless transmitter and receiver 396 of the adapter 102A. Moreover, the two word audio clip is sent through the PCIPL wireless transmitter and receiver 398, the PCIPL communication channel circuitry 348, the CODEC 344, and to speech recognition software 604 for processing,.

Specifically, at the PCIP adapter circuit level, the SLIC 312 converts 2-Wire audio from the telephone set 104A of "Intercom broadcast" to appropriately biased audio signals to send to the communication channel circuitry 316. The communication channel circuitry 316 converts the analog "Intercom broadcast" signal to a high frequency modulated signal that is transmitted throughout the home on the communication channel which uses the telephone line 101 or wireless carrier.

The communication channel circuitry 348 on the PCIPL board 142 recovers the "Intercom broadcast" signal and sends the analog audio signal to the CODEC 344. The CODEC 344 digitizes the analog audio signal and passes digitized audio signal (i.e. wavefile) to the PC system 141 over the PC system bus 196 (or PC Internal Bus) for speech recognition processing.

The ID information of the PCIP adapter 102A is also sent to the PC system 141 through the PCIPL controller 346 via the control channel between the PCIP adapter 102A and the PCIPL board 142.

In step 1312, after receiving the wavefile, the speech recognition software 604 on the PC system 141 uses algorithms to recognize the speech. In this case, the speech recognition software recognizes the command "Intercom" as a command and recognizes "broadcast" as a mode of operation.

In step 1314, the PCIP control program 602 establishes an audio communication channel between the handset of telephone set 104A and the speakers of the other PCIP adapters (102B, . . . , 102N).

In step 1316, user1 speaks "Susan, can you come to the phone?" The audio of "Susan, can you come to the phone?" is sent to the speakers of the other PCIP adapters (102B, . . . , 102N) via respective audio communication channels.

In step 1318, user2 picks up the telephone handset. In this example, it is assumed that the PCIP adapter 102B is located in the kitchen, however user2 could pick up the handset of any PCIP-equipped telephone.

In step 1320, the controller 314 of the PCIP adapter 102B formulates an information data packet to be sent to the PCIP control program 602 corresponding to this newly generated Off-hook condition. With the embodiment shown in FIG. 3A, this packet is sent from the controller 314 through the control channel circuitry 318, and the high frequency interface circuitry 320 of the PCIP adapter 102B. Furthermore, the packet is sent through the telephone line 101, the PCIPL high frequency interface circuitry 352, the PCIPL control channel circuitry 350, and to the PCIPL controller 346. With the embodiment shown in FIG. 3D, this packet is sent from the controller 314 through the control channel circuitry 318, and the wireless transmitter and receiver 396 of the PCIP adapter 102B. Moreover, the packet is sent through the PCIPL wireless transmitter and receiver 398, the PCIPL control channel circuitry 350, and to the PCIPL controller 346. The PCIPL controller 346 alerts the PCIP control program 602 on the PC system 141 of the off-hook change of state.

In step 1322, the PCIP control program 602 sends a command to establish a full duplex audio communication channel between the telephone handsets of user1 and user 2, where the higher communication channel frequency will carry audio from user1 to user2 and the lower communication channel frequency will carry audio from user2 to user1. To coordinate the various PCIP adapters such that they transmit and receive on the correct frequencies, the PCIP control program 602 sends out appropriate commands. With the embodiment shown in FIG. 3A, each command is sent through: the PCIPL controller 346 (where the command is converted to a network data packet), the PCIPL control channel circuitry 350, the PCIPL high frequency interface circuitry 352, and telephone line 101. Furthermore, each command is sent through the high frequency interface circuitry 320, the control channel circuitry 318, and to the controller 314 of the respective PCIP adapters 102A and 102B, where the command is used to enable and/or switch the transmit and receive frequencies of the communication channels. With the embodiment shown in FIG. 3D, this command is sent through: the PCIPL controller 346 (where the command is converted to a network data packet), the PCIPL control channel circuitry 350, and the PCIPL wireless transmitter and receiver 398. Moreover, each command is sent through the wireless transmitter and receiver 396, the control channel circuitry 318, and to the controller 314 of the respective PCIP adapters 102A and 102B, where the command is used to enable and/or switch the transmit and receive frequencies of the communication channels.

After step 1322 has established the full duplex audio communication channel, user1 and user2 can intercom with each other.

In step 1324, one of the two users replaced his/her handset. In this example, it is assumed that user1 replaces the handset of the telephone set 104A.

In step 1326, the PCIPA(102A) controller 314 formulates an information data packet to be sent to the PCIP control program 602, corresponding to this newly generated Off-hook condition. This information data packet is sent to the PCIP control program 602 via the control channel, as described in step 1306.

In step 1328, the PCIP control program 602 sets the PCIP system 100 to the Idle-Ready state, in response to the information data packet formulated in step 1326.

Caller ID Broadcasting Operation of the PCIP System

Figure 14:
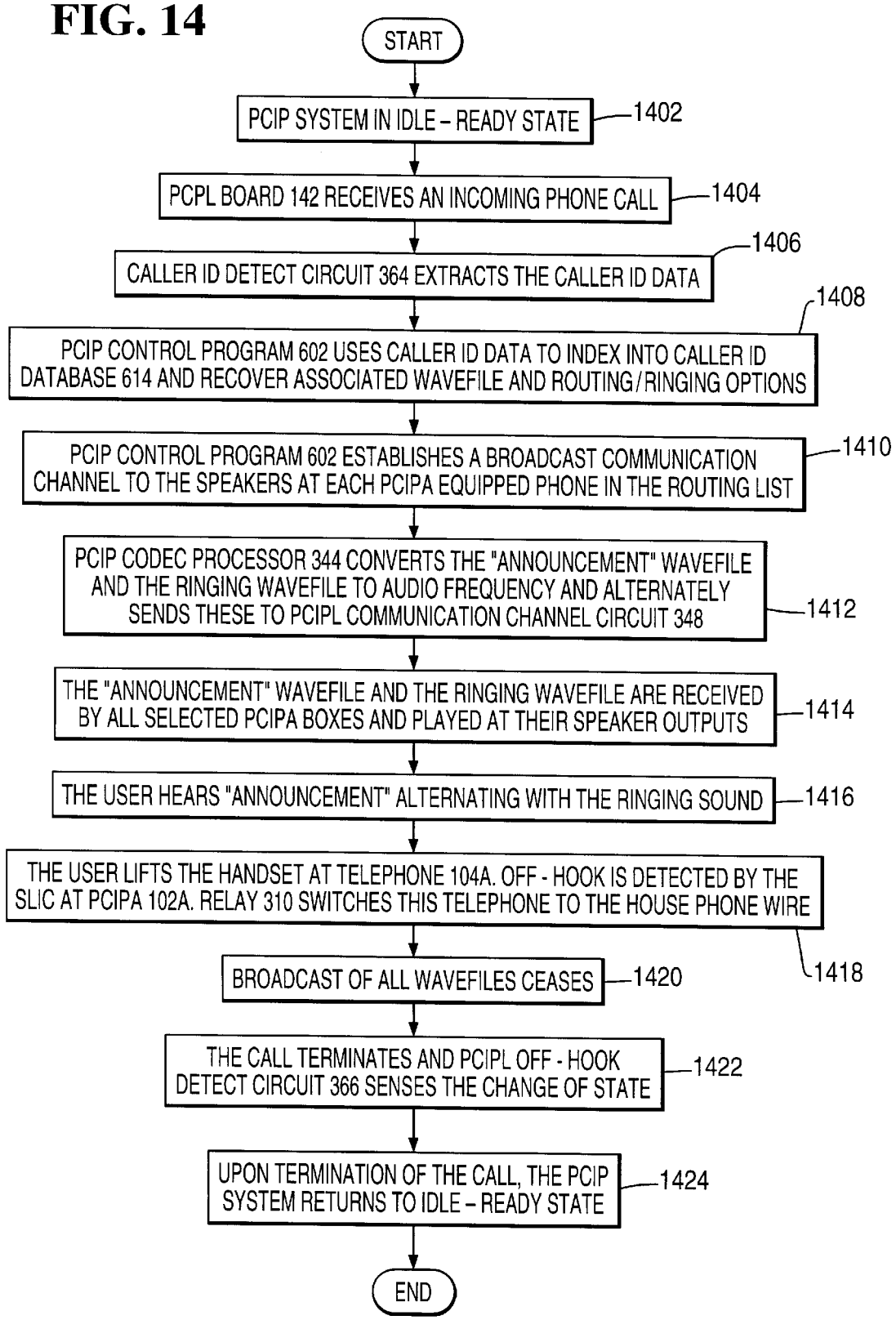
FIG. 14 shows a flowchart illustrating the steps for performing a Caller ID broadcasting operation of the PCIP system of FIG. 1.

Referring to FIG. 14, there is shown a flowchart illustrating the steps for performing a Caller ID broadcasting operation of the PCIP system 100. As shown in FIG. 14, in step 1401, the PCIP system 100 is initially in an Idle-Ready state, which means: the PC LED 404 on the adapter boxes 202A–202N is ON (lighted, indicating that the PC system 141 is on and connected to the adapters 102A–102N); the PCIPL board 142 is active; and the relay 310 on the adapters 102A–102N are switched to the SLIC 312. In this example, it is preferred that the relay 310 is initially connect the telephone sets 104A–104N to the SLIC 312 of the adapters 102A–102N for two reasons. The first reason being that the user initiating the PCIP features should ideally be able to speak commands to the PCIP system 100 immediately after picking up the handset of a telephone set 104A–104N without speaking over a dialtone sound. The second reason being that for the Called ID broadcasting feature of the PCIP system 100, it is preferable that the telephone sets 104A–104N do not receive the ringing currents supplied by the telephone company. The user always has the option of over-riding the default setting of the relay 310 by pressing the line button 410, which will result in a normal dialtone condition.

In step 1404, the PCIPL board 142 receives an incoming phone call from the telephone line 101. Conventionally, the incoming phone call causes wired phones to ring. However, the telephone sets 104A–104N equipped with PCIP adapters 102A–102N do not ring because, in each case, the relay 310 of the adapters 102A–102 N is switched to its respective SLIC 312. A mix of traditionally wired telephone sets and PCIPA equipped telephone sets is supported by the PCIP system 100. It is preferred that the PCIPA equipped telephone sets do not ring immediately because call routing requires that the Caller ID information be decoded from telephone line 101 between the first and second ring by telephony convention. After extracting that information, routing can be performed, such that only selected (or all or none) ones of the telephone sets 104A, 104B, ..., 104N in the home will be rung.

In step 1406, the caller ID detect circuit 364 on the PCIPL board 142 extracts the Caller ID data that is encoded between the first and second rings. (The user must purchase caller-ID feature from the local phone company to make use of this PCIP capability.) This data is made available in a register that is readable by the PC system 141. An interrupt is sent to the PCIP control program 602 to initiate a transfer of the Called ID data from the PCIPL board 142 to the memory storage 504.

In step 1408, the PCIP control program 602 uses the Caller ID data to index into the Caller ID database 615. In this scenario, three possibilities exist: no entry, entry corresponds to "No-ring", a unique entry exists.

If no entry exists, a default routing is selected, in which the PCIP control program 602 routes the ring to all the PCIP telephone sets 104A, 104B, ..., 104N. The PCIP control program 602 then saves the Caller ID data in a special memory area in the memory storage 504, called LastCID. This will be used if a user later decides to use the Caller ID Save feature, which is illustrated in flowchart for FIG. 15.

If the entry corresponds to "No-ring", no phone will be rung. This might be a case where the user wants a conventional answering machine or a FAX machine to pick up this call. To set up a "No-ring" in an entry, the owner of the PCIP system 100 can predetermine which Caller ID should cause none of PCIPA equipped telephone sets 104A–140N to ring, see the final step of FIG. 15.

Otherwise, if a unique entry exists that corresponds to the Caller ID data, then the PCIP control program 602 will retrieve the associated wavefile, distinctive ringing preference and routing information form the Caller ID database 615. The wavefile consists of a digital representation of an audio clip that was pre-recorded by the user to "announce" the source of the incoming call. The distinctive ringing information selects which of several ringing sound wavefiles will be played at the PCIPA speakers. In an upcoming step, these ringing wavefiles will be played alternating with the Caller ID announcement wavefile. The routing information is a list of which PCIPA equipped telephone sets 104A–104N in the home will receive the Caller ID announcement and ringing audio. The procedure for making an entry in Caller ID database 615 and adding user preferences will be subsequently described in the Caller ID Save flowchart shown in FIG. 15.

In step 1410, the PCIP control program 602 establishes a broadcast communication channel from CODEC 344 to all of the PCIP adapters 102A, 102B, ..., and/or 102N selected by the routing list. To establish this broadcast channel, the PCIP control program 602 sends control information to all of the PCIPA controllers 314 of the PCIP adapters 102A–102N selected by the routing list, so that, for each selected adapter 102A–102N, a respective communication channel can be established to allow the selected PCIP adapters 102A–102N to receive broadcast audio originating from the CODEC 344 of the PCIPL board 142.

At the PCIPL board level, the PCIPL controller 346 forms information data packet for all the PCIP adapters 102A–102N selected by the routing list, to specify which of the two communication channels will carry the audio signal and which PCIP adapters 102A–102N should route the audio signal to their respective speakers 308. Assuming that the adapter 102A is selected by the routing list, with the embodiment shown in FIG. 3A, this packet is sent through the PCIPL control channel circuitry 350, the PCIPL high frequency interface circuitry 352 and the telephone line 101. Moreover, the packet is sent through the high frequency interface circuitry 320, the control channel circuitry 318, and to the controller 314 of the PCIP adapter 102A. Similarly, with the embodiment shown in FIG. 3D, this packet is sent to through the PCIPL control channel circuitry 350 and the PCIPL wireless transmitter and receiver 398. Furthermore, the packet is sent through the wireless transmitter and receiver 396, the control channel circuitry 318, and to the controller 314 of the PCIP adapter 102A.

In step 1412, the CODEC 344 converts the Caller ID announcement wavefile and the ringing wavefile to audio signals and alternately sends the audio signals to the PCIPL communication channel circuit 348.

In step 1414, the Caller ID announcement wavefile and the ringing wavefile are sent from the PCIPL board 142, received by all selected PCIP adapters 102A–102N, and played by the respective speakers 308 of the selected PCIP adapters 102A–102N. Assuming that PCIP adapter 102A is selected, with the embodiment shown in FIG. 3A, these two wavefiles are sent through the PCIPL communication channel circuitry 348, the PCIPL high frequency interface circuitry 352, and the telephone line 101. Furthermore, the wavefiles are sent through the high frequency interface circuitry 320, the communication channel circuitry 316, the amplifier 306, and to the speaker 308 of the PCIP adapter 102A. Likewise, with the embodiment shown in FIG. 3D, these two wavefiles are sent through the PCIPL communication channel circuitry 348 and the PCIPL wireless transmitter and receiver 398. Moreover, the wavefiles are sent through the wireless transmitter and receiver 396, the communication channel circuitry 316, the amplifier 306, and to the speaker 308 of the PCIP adapter 102A.

In step 1416, the output from the speakers 308 that are connected to selected adapters 102A–102N are audible in the vicinity of the selected PCIP adapter boxes 202A–202N. The user in the vicinity of a selected PCIP adapter boxes 202A–202B hears the Caller ID announcement alternating with the ringing sound and can discern who the caller is. If the user chooses, he/she can answer the call.

In step 1418, the user lifts the handset at telephone 104A assuming that the user is in the vicinity of telephone 102A. An Off-hook state is detected by the SLIC 312 of the PCIP adapter 102A. The controller 314 of the adapter 102A senses the off-hook condition and causes the relay 310 to switch the telephone set 104A to the telephone line 101. The controller 314 also informs the PCIP control program 602 of the off-hook condition via the control channel.

Then, the user can proceed with the telephone call in a normal fashion.

In step 1420, the PCIP control program 602 causes the broadcast of all wavefiles to cease based on either: (i) as in this scenario, a PCIPA equipped telephone set 104A–104N entering an Off-hook state which is detected by the associated SLIC 312, (ii) a non-PCIPA equipped telephone set entering an Offhook state which is detected by the Off-Hook detect circuit 366 of the PCIPL board 142, or (iii) no telephone set is picked up and eventually the ringing stops which is detected by the ring detect circuit 362 of the PCIPL board 142.

In step 1422, the call terminates and both parties hang up their respective telephone sets. The PCIPL Off-Hook detect circuit 362 senses the resulting change of impedance on the telephone line 101 and signals this change of state to the PCIP control program 602.

In step 1424, the PCIP control program 602, being informed of the termination of the call, causes the PCIP system 100 to return to the Idle-Ready state.

Caller ID Save Operation of the PCIP System

Figure 15:
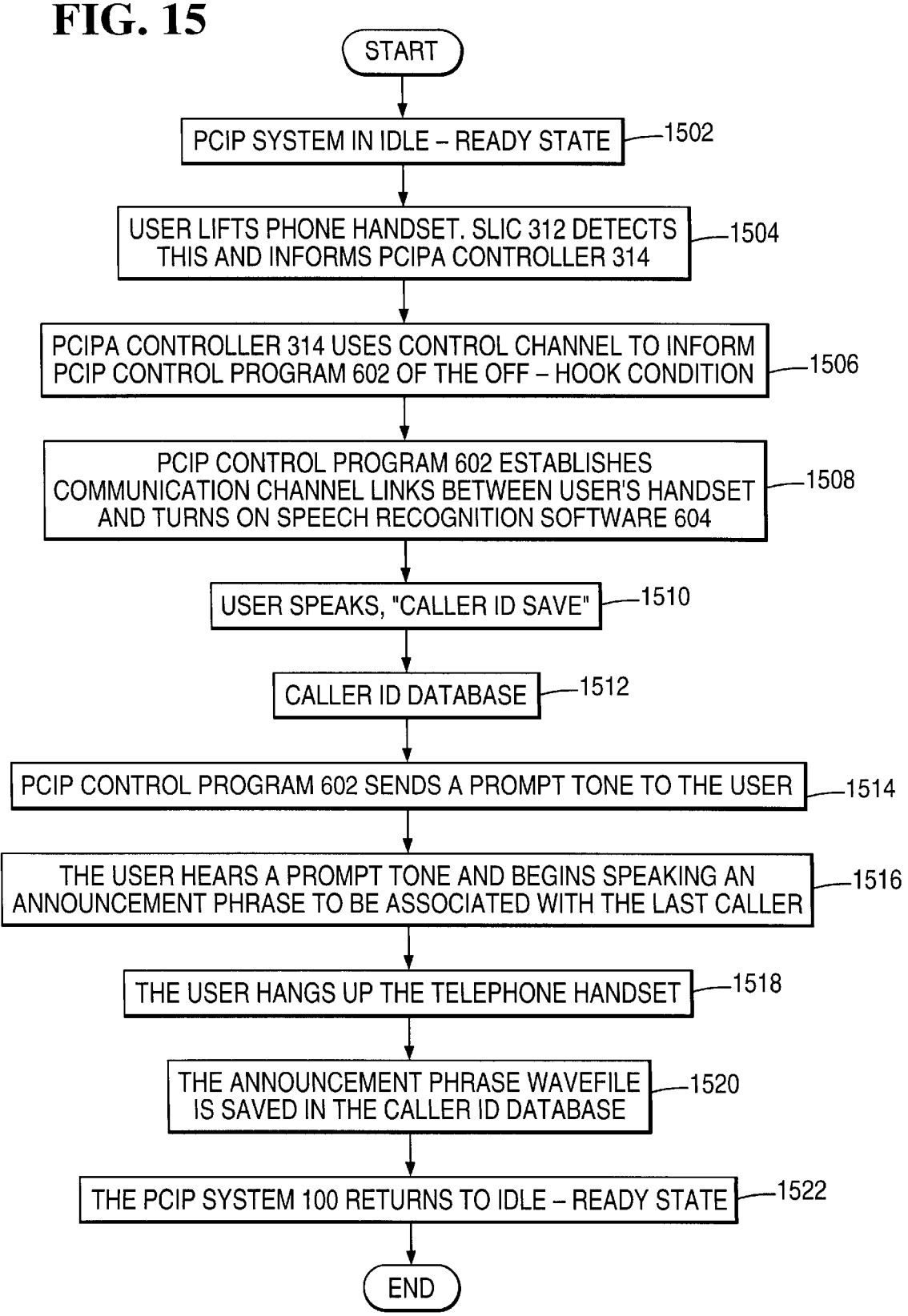
FIG. 15 shows a flowchart illustrating the steps for a user to execute a Caller ID save operation of the PCIP system of FIG. 1.

Referring to FIG. 15, there is shown a flowchart illustrating steps for performing a Caller ID save operation of the PCIP system 100. This feature provides a quick, convenient mechanism of populating the Caller ID database 615 with entries. In general, one entry is made at a time associated with the last caller. In particular, the PCIP system 100 saves the characteristic Caller ID of the last caller into a memory location called the Last Caller ID.

One embodiment of the present invention is offered for populating Caller ID database 615, other variations should be apparent to those skilled in the art. In particular, a variation using the PCIP user interface software 603 allows the user to sit at the PC system 141 to populate many entries into the caller ID database 615 at once and to set a routing table for each of the entries. In this variation, the user is able to manually enter phone number patterns of expected callers and use a microphone to record announcement wavefiles associated with these phone number patterns.

In describing the operation shown in FIG. 15, it is assumed that a user initiates the operation at the telephone set 104A equipped with the adapter 102A. In a preferred embodiment, the other telephone sets 104B, . . . , 104N may also be used to perform the Caller ID save operation.

In step 1502, the PCIP system 100 is initially in the Idle-Ready State, which means: the PC LED 404 on the adapter box 202A is ON (lighted), indicating that the PC system 141 is on and connected to the adapter 102A; the PCIPL board 142 is active; the relay 310 on the adapter 102A is switched to the SLIC 312. In this example, it is preferred that the relay 310 is initially connects the telephone set 102A to the SLIC 312 so that the user may speak commands to the PC system 141 immediately after picking up the handset of telephone 104A without speaking over a dialtone sound. Being connected to the relay 310, the SLIC 312 can provide the capability of determining that the handset of the telephone set 104A has been lifted, which eventually causes the speech recognition software 604 to be initiated on the communication channel. The user always has the option of over-riding the default setting of the relay 310 by pressing the line button 410, which will result in a normal dialtone condition.

In step 1504, to provide an announcement wavefile associated with the last caller, the user lifts the handset of the telephone set 104A. To ensure a proper operational condition, the user looks at the panel 329 on the adapter box 202A to verify that the PC LED 404 is ON so that the user knows that he/she can communicate verbally with the PC system 141. On the other hand, if the user did not want to use PCIP related features of the PCIP system 100, he/she could press the line button 410 which would cause the line LED 406 to come on, and a normal dialtone to be presented to the user of the telephone set 104A. At the PCIP adapter circuit level, when the handset is lifted, the SLIC 312 detects an Off-hook state and signals the Off-hook state to the controller 314.

In step 1506, the controller 314 forms an information data packet corresponding to the newly generated Off-hook condition and sends the packet to the PCIP controller 346. With the embodiment shown in FIG. 3A, the packet is sent from the PCIPA controller 314 through the PCIPA control channel circuitry 318, the PCIPA high frequency interface circuitry 320, and the telephone line 101. Furthermore, the packet is sent through the PCIPL high frequency interface circuitry 352, the PCIPL control channel circuitry 350, and to the PCIPL controller 346. With the embodiment shown in FIG. 3D, the packet is sent from the is PCIPA controller 314 through the PCIPA control channel circuitry 318 and the PCIPA wireless transmitter and receiver 396. Moreover, the packet is sent through the PCIPL wireless transmitter and receiver 398, the PCIPL control channel circuitry 350, and to the PCIPL controller 346. The PCIPL controller 346 alerts the PCIP control program 602 on the PC system 141 of the Off-hook change of state.

In step 1508, after receiving the information data packet associated with PCIP adapter 102A, the PCIP control program 602 communicates with all PCIP adapters 102A, 102B, . . . , 102N using the control channel in order to establish a single bi-directional communication channel between the PCIP adapter 102A and PCIPL board 142. As a result of establishing the signal bi-directional communication channel, the other PCIP adapters 102B, . . . , 102N of the PCIP system 100 turn off their respective communication channel transmitters. After establishing the signal bidirectional communication channel, the PCIP control program 602 invokes the speech recognition software 604, which begins monitoring the communication channel to discern audio signals into known audio patterns.

In step 1510, after picking up the handset of the telephone set 104A, the user speaks his/her feature request into the handset, for example, "Caller ID Save". This example assumes that the prior setup activity happens quickly enough that the user does not need to be prompted. With the embodiment shown in FIG. 3A, this audio clip is sent to the speech recognition software 604 for processing through the SLIC 312, the PCIPA communication channel circuitry 316, the PCIPA high frequency circuitry 320, and the telephone line 101. Moreover, the audio clip is sent through the PCIPL high frequency interface circuitry 352, the PCIPL communication channel circuitry 348, and the CODEC 344. With the embodiment shown in FIG. 3D, this audio clip is sent to speech recognition software 604 for processing through the SLIC 312, the PCIPA communication channel circuitry 316, and the PCIPA wireless transmitter and receiver 396. Furthermore, the audio clip is sent through the PCIPL wireless transmitter and receiver 398, the PCIPL communication channel circuitry, and the CODEC 344.

Specifically, at the PCIP adapter circuit level, the SLIC 312 converts 2-Wire audio from the telephone set 104A of "Caller ID Save" to appropriately biased audio signals and sends the audio signals to communication channel circuitry 316. The communication channel circuitry 316 converts the analog audio "Caller ID Save" signal to a high frequency modulated audio signal and transmits the modulated audio signal throughout the home on the communication channel which uses the telephone line 101 or wireless carrier.

The communication channel circuitry 348 of the PCIPL board 142 recovers the analog "Caller ID Save" signal from the modulated audio signal and sends the analog signal to the CODEC 344. The CODEC 344 digitizes the analog signal to obtain a digitized audio signal (i.e. wavefile) and passes the wavefile to the PC system 141 over the PC system bus 196 (or PC Internal Bus) for speech recognition processing.

In step 1512, after receiving the wavefile, "Caller ID Save", the speech recognition software 604 on the PC system 141 uses algorithms to recognize the speech. In this case, the speech recognition software looks in SR Vocabulary database 612 and recognizes the command "Caller ID Save" as a feature invocation. The PCIP control program 602 makes an entry in the Caller ID database 615 and inserts the contents of the "Last Caller ID" memory location as one part of that entry. The PCIP control program 602 then waits for the user to provide the announcement wavefile to complete this entry.

In step 1514, a prompt tone is sent to the handset of the telephone 104A to prompt the user to speak the announcement phrase associated with the last Caller ID. To send the prompt tone, the PCIP control program 602 causes the CODEC 344 of the PCIPL board 142 to generate the distinctive audio tone. With the embodiment shown in FIG. 3A, the tone is sent to the handset of telephone set 104A through the PCIPL communication channel circuitry 348, the PCIPL high frequency interface circuitry 352, and the telephone line 101. Furthermore, the tone is sent through the PCIPA high frequency interface circuitry 320, the PCIPA communication channel circuitry 316, and the SLIC 312. With the embodiment shown in FIG. 3D, the tone is sent to the handset of telephone set 104A, through the PCIPL communication channel circuitry 348, and the PCIPL wireless transmitter and receiver 398. Moreover, the tone is sent through the PCIPA wireless transmitter and receiver 398, the PCIPA communication channel circuitry 316, and the SLIC 312.

In step 1516, after the user hears the prompt tone, he user begins speaking an announcement phrase to be associated with the last caller. For example, depending on the last caller the user might speak, "Susan Jones", or "ACME Lawn Service", or "out of area call". This phrase is transmitted to the PC system 141 via the communication channel in a similar manner as was the command, "Caller ID Save".

In step 1518, the user replaces the handset of telephone set 104A. The SLIC 312 detects and reports the on-hook condition similar to how the SLIC 312 reported the off-hook condition.

In step 1520, upon receiving the on-hook signal, the PCIP control program 602 causes the phrase, which has been digitally encoded into a wavefile by the CODEC 344, to be stored in the Caller ID database 615 along with the Last Caller ID. In the future, when the caller having this Caller ID pattern calls again, the associated wavefile will be retrieved and played at the selected PCIPA boxes to announce who the caller is.

In step 1522, the PCIP system 100 returns to the Idle-Ready state.

In some later time, the user may invoke the PCIP user interface program 603 to enter routing and ringing preferences. Alternatively, the user may simply use the defaults, which would typically mean, for a particular Caller ID ring all the PCIP equipped telephone sets 104A–104N of the PCIP system 100 with a normal sounding ringing pattern alternating with the Caller ID announcement. If the user chooses to change this default, then he/she would sit at the PC monitor/keyboard/mouse human interface and invoke the PCIP user interface program 603. The user would typically point and click on the Caller ID database entry to change, then point-and-click on which PCIPA equipped telephone sets 104A–104N to route the broadcast to, and then point-and-click on which ringing pattern to play.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims. For example, it should be appreciated that even though embodiments of the present invention are described in a home environment, the principle of the present invention can be readily used in other environments, such as a small office environment.

Moreover, while preferred embodiments of the PCIP system have been described with certain PCIP features, it should be understood that an interactive phone system in accord with the present invention may not include every PCIP feature described herein.

What is claimed is:

1. A phone system controller for use with a phone system adaptor that is interposed between and selectively couples a telephone to a first access point of a telephone line, the phone system controller comprising:

a computer system operable to be coupled to a second access point of the telephone line comprising a processor and an expansion slot operable to couple an expansion card to said processor, and an interactive phone system board coupled to said expansion slot, said interactive phone system board including a connector operable to connect said computer system to the second access point of the telephone line, said interactive phone system board operable to (i) establish a communication channel with said phone system adapter that permits normal concurrent use of said telephone line by another telephone couplable to a third access point of the telephone line while said communication channel is established, (ii) receive audio signals from said telephone, and (iii) provide said computer system with said audio signals via said communication channel.

2. The phone system controller of claim 1, wherein:

said audio signals include an auto-dial request, and said computer system is operable to (i) determine from a database of said computer system a telephone number corresponding to said auto-dial request, and (ii) provide said interactive phone system board with first control signals which cause said interactive phone system board to dial said telephone number by applying signals to said telephone line.

3. The phone system controller of claim 2, wherein:

said interactive phone system board is further operable to (i) establish a control channel to said phone system adapter, and (ii) transmit second control signals to said phone system adapter via said control channel in response to receiving said first control signals from said computer system, said second control signals causing said phone system adapter to couple said telephone set to said telephone line.

4. The phone system controller of claim 1, wherein:

said audio signals include an auto-dial programming request and a telephone number, and said computer system is operable to update a database of said computer system with said telephone number corresponding to said auto-dial programming request.

5. The phone system controller of claim 1, wherein:

said audio signals include a voice addressed intercom request that includes an intercom location, and said computer system is operable to (i) determine from a database of said computer system an intercom associated with said intercom location, and (ii) establish said communication channel such that said communication channel is operable to carry voice signals between said telephone set and said intercom associated with said intercom location.

6. A telephone system for providing advanced telephony features, comprising a first phone system adapter and a phone system controller, wherein:

said first phone system adapter is coupled between a first telephone handset and a first access point of a telephone line, said first phone system adapter operable to (i) selectively couple said first telephone handset to said telephone line, (ii) receive an oral command from said first telephone handset when said first telephone handset is decoupled from said telephone line, and (iii) transmit said oral command to said phone system controller via said telephone line while said first telephone handset is decoupled from said telephone line, and said phone system controller is coupled to a second access point of said telephone line, said phone system controller comprising a personal computer system having an interactive phone system board and a computer readable medium, said computer readable medium including programs that configure said personal computer system and said interactive phone system board to (i) receive said oral commands via said telephone line, and (ii) execute said oral command.

7. The telephone system of claim 6, wherein:

said oral command includes an auto-dial request, and said phone system controller is operable to (i) determine from a database of said personal computer system a telephone number corresponding to said auto-dial request, and (ii) provide said interactive phone system board with first control signals which cause said interactive phone system board to dial said telephone number by applying signals to said telephone line.

8. The telephone system of claim 6, wherein:

said interactive phone system board is further operable to (i) establish a control channel to said first phone system adapter, and (ii) transmit second control signals to said first phone system adapter via said control channel in response to receiving said oral command via said communication channel, said second control signals causing said first phone system adapter to couple said first telephone set to said telephone line.

9. The telephone system of claim 6, wherein:

said oral command includes an auto-dial programming request and a telephone number, and said phone system controller is operable to update a database of said personal computer system with said telephone number corresponding to said auto-dial programming request.

10. The telephone system of claim 6, further comprising:

a second phone system adapter which is coupled between a second telephone handset and said telephone line, wherein:

said oral command includes a voice addressed intercom request that includes an intercom location which corresponds to said second phone system adapter, and said phone system controller is operable to (i) determine from a database of said personal computer system that said intercom location of said voice addressed intercom request corresponds to said second phone system adapter, and (ii) re-establish said communication channel such that said communication channel is operable to carry voice signals between said first telephone set and said second telephone set via said first phone system adapter and said second phone system adapter and said telephone line without interfering with normal use of said telephone line.

11. The telephone system of claim 6, wherein:

said first phone system adapter is further operable to (i) modulate said oral command to obtain a modulated oral command that lies outside of a normal audio band for said telephone line, and (ii) transmit said oral command to said phone system controller by transmitting said modulated oral command to said phone system controller via said telephone line, and said interactive phone system board of said phone system controller is operable to demodulate said modulated oral command to obtain said oral command.

12. The telephone system of claim 6, wherein:

said first phone system adapter is further operable to (i) modulate said oral command upon a carrier having a frequency between 270 KHz and 540 KHz to obtain a modulated oral command, and (ii) transmit said oral dialing command to said phone system controller by transmitting said modulated oral command to said phone system controller via said telephone line, and said interactive phone system board of said phone system controller is operable to demodulate said modulated first oral dialing command to obtain said first oral dialing command.

13. The telephone system of claim 6, further comprising:

a plurality of phone system adapter boxes respectively coupled between a plurality of telephone sets and said telephone line, said plurality of phone system adapter boxes operable to (i) selectively couple said respective telephone set to said telephone line, and (ii) audibly present information via a respective speaker of said plurality of phone system adapter boxes, wherein:

said oral command includes a voice broadcast intercom request, and said phone system controller is operable to (i) determine via speech recognition software of said personal computer system that said oral command is a broadcast intercom request, and (ii) re-establish said communication channel such that said communication channel is operable to carry voice signals between said first telephone set and said respective speakers of said plurality of phone system adapter boxes via said telephone line without interfering with normal use of said telephone line.

14. The telephone system of claim 6, further comprising:

a plurality of phone system adapter boxes respectively coupled between a plurality of telephone sets and said telephone line, said plurality of phone system adapter boxes operable to (i) selectively couple said respective telephone set to said telephone line, and (ii) audibly present information via a respective speaker of said plurality of phone system adapter boxes, each of said phone system adapter boxes having a unique address, wherein:

said phone system controller is further operable to (i) obtain caller ID information from an incoming call, (ii) determine from a database of said personal computer system and said caller ID information a list of phone system adapter boxes said incoming call is to be routed, and (iii) routing said incoming call to said phone system adapter boxes of said list.

15. The telephone system of claim 14, wherein:

said phone system controller is further operable to (iv) obtain a distinctive ring from said database based upon said caller ID information, and (v) apply said distinctive ring to each of said speakers of said phone system adapter boxes of said list.

16. The telephone system of claim 14, wherein:

said phone system controller is further operable to (iv) obtain an audio clip associated with said caller ID information from said database, and (v) apply said audio clip to each of said speakers of said phone system adapter boxes of said list.

17. The telephone system of claim 14, wherein:

said phone system controller is further operable to (iv) save said caller ID information in a memory location of said personal computer system, (v) receive an oral caller ID save request via a telephone set coupled to said plurality of phone system adapter boxes, (vi) receive an audio clip to associate with said caller ID information, and (vii) store said audio clip and said caller ID information in said database of said personal computer system.

18. A method of providing a telephone with an advanced telephony feature, comprising the steps of:

decoupling said telephone from a telephone line;

transmitting an oral command from said telephone to a phone system adapter box coupled to said telephone line via a first access point while said telephone is decoupled from said telephone line;

transmitting said oral command from said phone system adapter box to an interactive phone system board of a personal computer system via said telephone line while said telephone is decoupled from telephone line; and processing said oral command at said personal computer system in order to provide said advanced telephony feature.

19. The method of claim 18, wherein:

said transmitting step comprises the step of transmitting an auto-dial request, and said processing step comprises the steps of (i) determining that said oral command is an auto-dial command, (ii) obtaining a telephone number associated with said auto-dial command from a database of said personal computer system, and (iii) applying signals to said telephone line in order to dial said telephone number.

20. The method of claim 18, wherein:

said transmitting step comprises the step of transmitting a voice addressed intercom request comprising an oral intercom location, and said processing step comprises the steps of (i) determining that said oral command is a voice address intercom request, (ii) obtaining an intercom address from a database of said personal computer system based upon said oral intercom location, and (iii) establishing an audio communication channel on said telephone line that audibly couples said telephone set and an intercom associated with said intercom address without interfering with the normal operation of said telephone line.

* * * * *